United States Patent
Sugiura et al.

(10) Patent No.: US 6,247,031 B1
(45) Date of Patent: *Jun. 12, 2001

(54) IMAGE FILING SYSTEM FOR MEMORIZING IMAGES READ FROM A GIVEN DOCUMENT TOGETHER WITH SMALL CHARACTERIZING IMAGE

(75) Inventors: Masamichi Sugiura; Kaoru Tada; Hiroya Sugawa, all of Osaka (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/478,892

(22) Filed: Jun. 7, 1995

Related U.S. Application Data

(63) Continuation of application No. 08/243,063, filed on May 13, 1994, now abandoned, which is a continuation of application No. 08/016,491, filed on Feb. 10, 1993, now abandoned, which is a continuation of application No. 07/900,544, filed on Jun. 18, 1992, now abandoned, which is a continuation of application No. 07/782,799, filed on Oct. 24, 1991, now abandoned, which is a continuation of application No. 07/345,810, filed on May 1, 1989, now abandoned, which is a continuation of application No. 08/478,892, filed on Jun. 7, 1995, now abandoned.

(30) Foreign Application Priority Data

| Apr. 30, 1988 | (JP) | 63-108780 |
| Apr. 30, 1988 | (JP) | 63-108781 |
| Apr. 30, 1988 | (JP) | 63-108782 |

(51) Int. Cl.7 .................................................. G06F 17/30
(52) U.S. Cl. ...................... 707/526; 707/104; 382/305; 382/306
(58) Field of Search ................................. 395/144–146, 395/155, 161, 788, 782, 766, 768, 773, 615; 382/309, 317, 190, 209, 305, 306; 707/104, 526

(56) References Cited

U.S. PATENT DOCUMENTS 4,408,181 * 10/1983 Nakayama .............................. 382/61
4,485,454 * 11/1984 Kimoto ................................ 364/900

(List continued on next page.)

FOREIGN PATENT DOCUMENTS

| 60-3790 | 1/1985 | (JP) . |
| 61-224558 | 10/1986 | (JP) . |

OTHER PUBLICATIONS

"Method for displaying directories of images", IBM Technical Disclosure Bulletin, v. 30, n. 11, p. 257, Apr. 1988.*

(List continued on next page.)

Primary Examiner—Joseph H. Feild
(74) Attorney, Agent, or Firm—Sidley & Austin

(57) ABSTRACT

An image filing system which uses, in addition to main document identification data in the form of a keyword assigned to a given document, auxiliary document identification data formulated to be representative of a characterizing portion of the image read from a given document, wherein the image data representative of the whole image read from the document is stored in one data storage area of a memory and the image data representative of the characterizing portion of the image is stored in another data storage area of the memory for use as the auxiliary document identification data. When the documents accessed as a result of the searching on the basis of a keyword or keywords, the auxiliary document identification data is displayed for each of the documents in addition to the keyword or keywords assigned to each of the documents listed on the display. This will help the operator of the system select and call the target document from among the listed documents by referencing the auxiliary document identification data as well as the main document identification data. The auxiliary document identification data is thus useful for distinguishing one document from another or others when the documents have a common keyword as the main document identification data.

18 Claims, 23 Drawing Sheets

U.S. PATENT DOCUMENTS

| | | | | |
|---|---|---|---|---|
| 4,553,206 | * | 11/1985 | Smutek et al. | 395/612 |
| 4,553,261 | * | 11/1985 | Froessl | 382/57 |
| 4,555,803 | * | 11/1985 | Hirose | 382/61 |
| 4,574,395 | * | 3/1986 | Kato | 382/56 X |
| 4,653,021 | * | 3/1987 | Takagi | 382/56 X |
| 4,758,980 | * | 7/1988 | Tsunekawa et al. | 382/61 X |
| 4,760,606 | * | 7/1988 | Lesnick et al. | 382/48 |
| 4,817,050 | * | 3/1989 | Komatsu et al. | 364/900 |
| 4,907,283 | * | 3/1990 | Tanaka et al. | 382/229 |
| 4,980,842 | * | 12/1990 | Kamada et al. | 395/310 |
| 5,165,103 | * | 11/1992 | Takeda et al. | 382/305 |
| 5,493,677 | * | 2/1996 | Balogh et al. | 707/104 |
| 5,572,726 | * | 11/1996 | Hasuo | 707/200 |

OTHER PUBLICATIONS

Hamano, "A similarity retrieval method for image database using simple graphics", 1988 IEEE Workshop on Languages for Automation, p. 149–154, Aug. 29, 1988.*

Chang et al., "An intelligent image database system", IEEE Transactions on Software Engineering, v. 14, n. 5, pp. 681–688, May 1988.*

Joseph et al., "Picquery: a high level query language for pictorial database management", IEEE Transactions on Software Engineering, v. 14, n. 5, pp. 630–638, May 1988.*

Yamamoto et al., "Extraction of Object Features from Image and Its Application to Image Retrieval", $9^{th}$ *Intl. Conf. on Pattern Recognition*, v. 2, pp. 988–991, Nov. 14,1988.*

Pan, "a picture and text query and archiving system", *Pattern Recognition*, v. 4, pp. 477–480, 12/1986.*

El–Sherbini et al., "The Wang Professional Image Computer: An Overview", Proc. of $7^{th}$ Annual Micron–Delcon '84, IEEE Delaware Bay Computer Conf. Mar. 1984, pp. 68–73.*

Tanaka et al., "Transmedia Machine and Its Keyword Search over Image texts", RIAO '88 Conf., User–Oriented Content–Based Text and Image Handling, v. 1, pp. 248–258, Mar. 1988.*

* cited by examiner

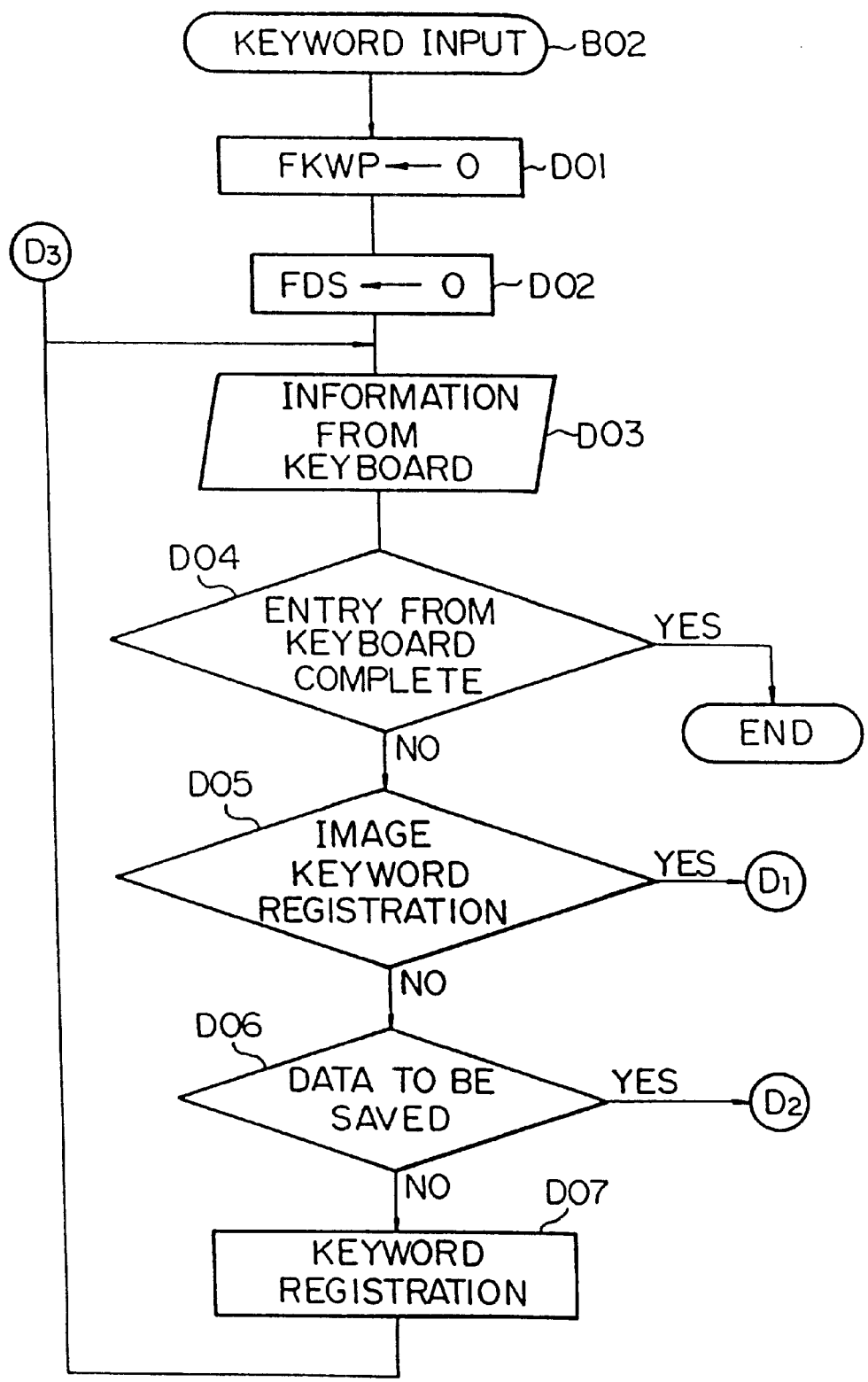

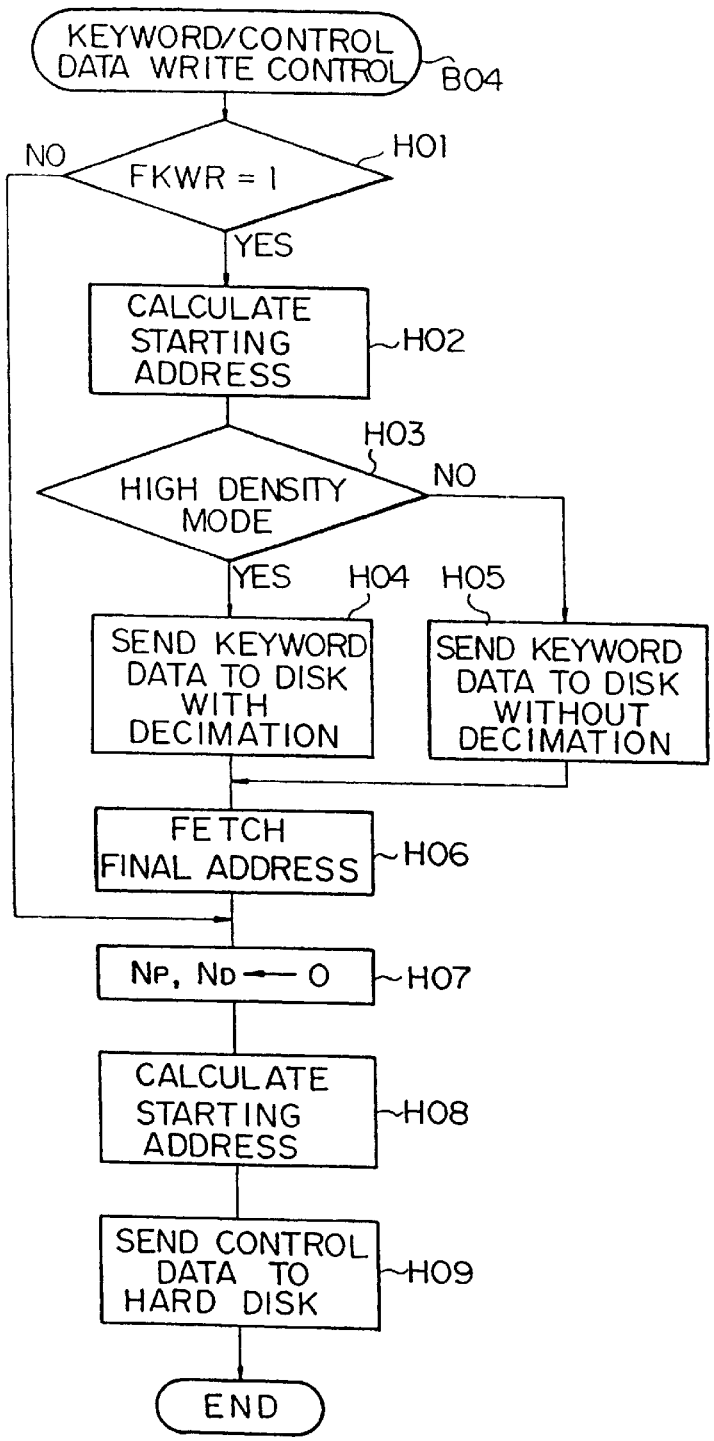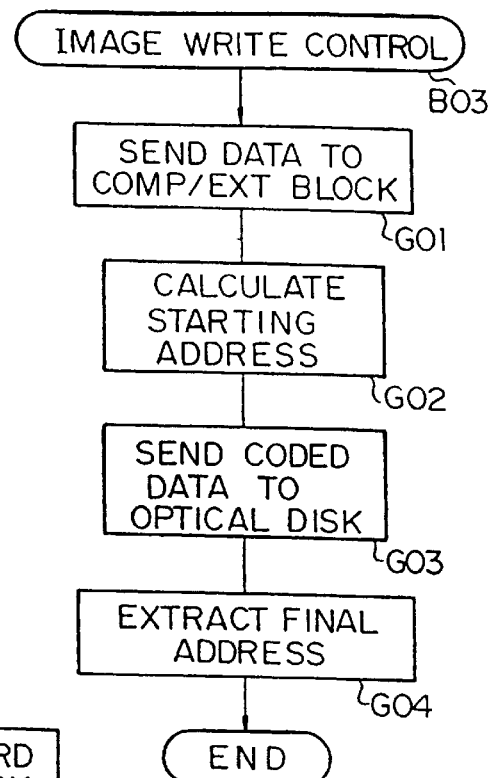

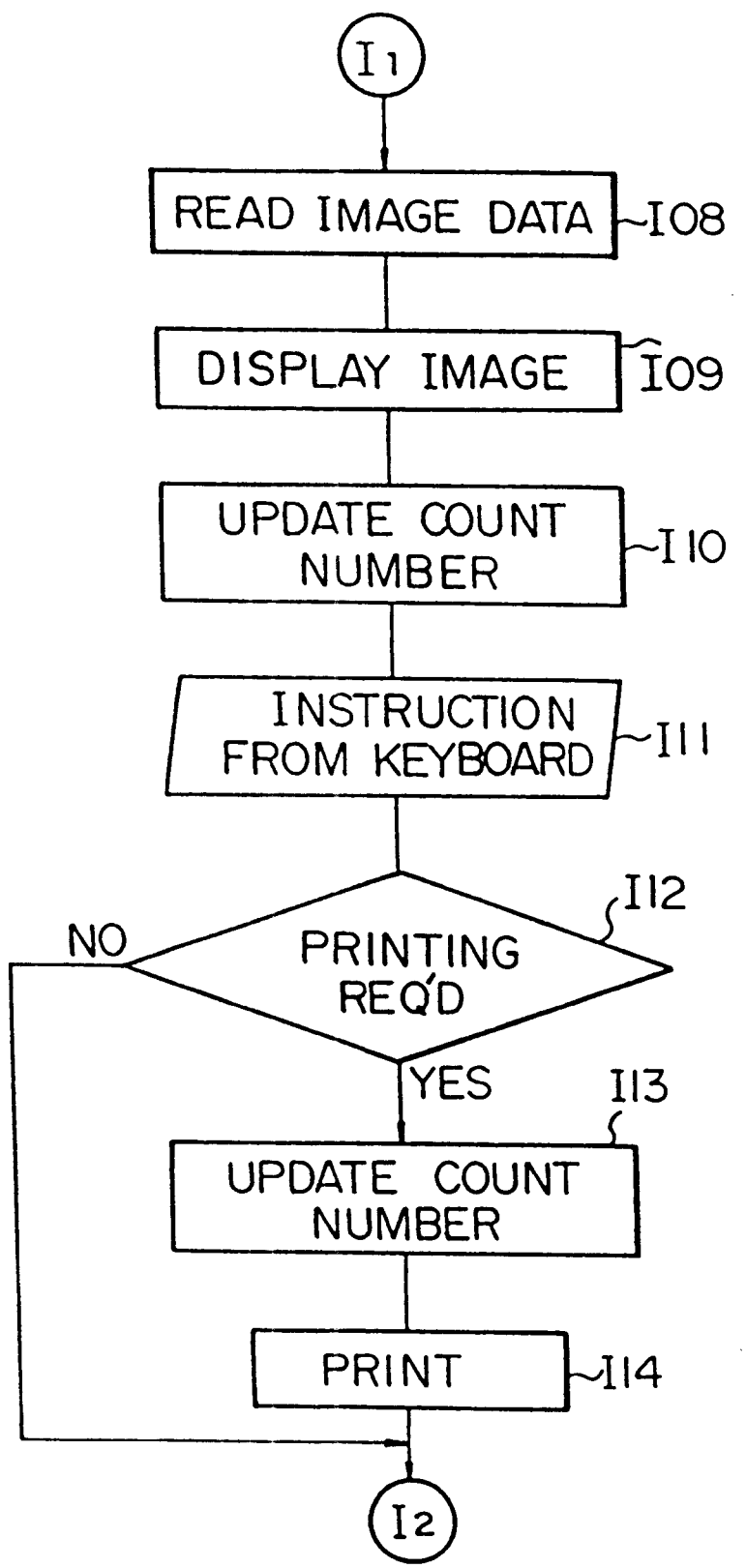

FIG.17A

| KEYWORD '1' | |
| KEYWORD '2' | |
| KEYWORD '3' | |
| KEYWORD '4' | |
| KEYWORD '5' | |
| RETRIEVE | |
| END | |

ENTER KEYWORD FOR SEARCH

FIG.17B

| PRINT | RE-RETRIEVE | |

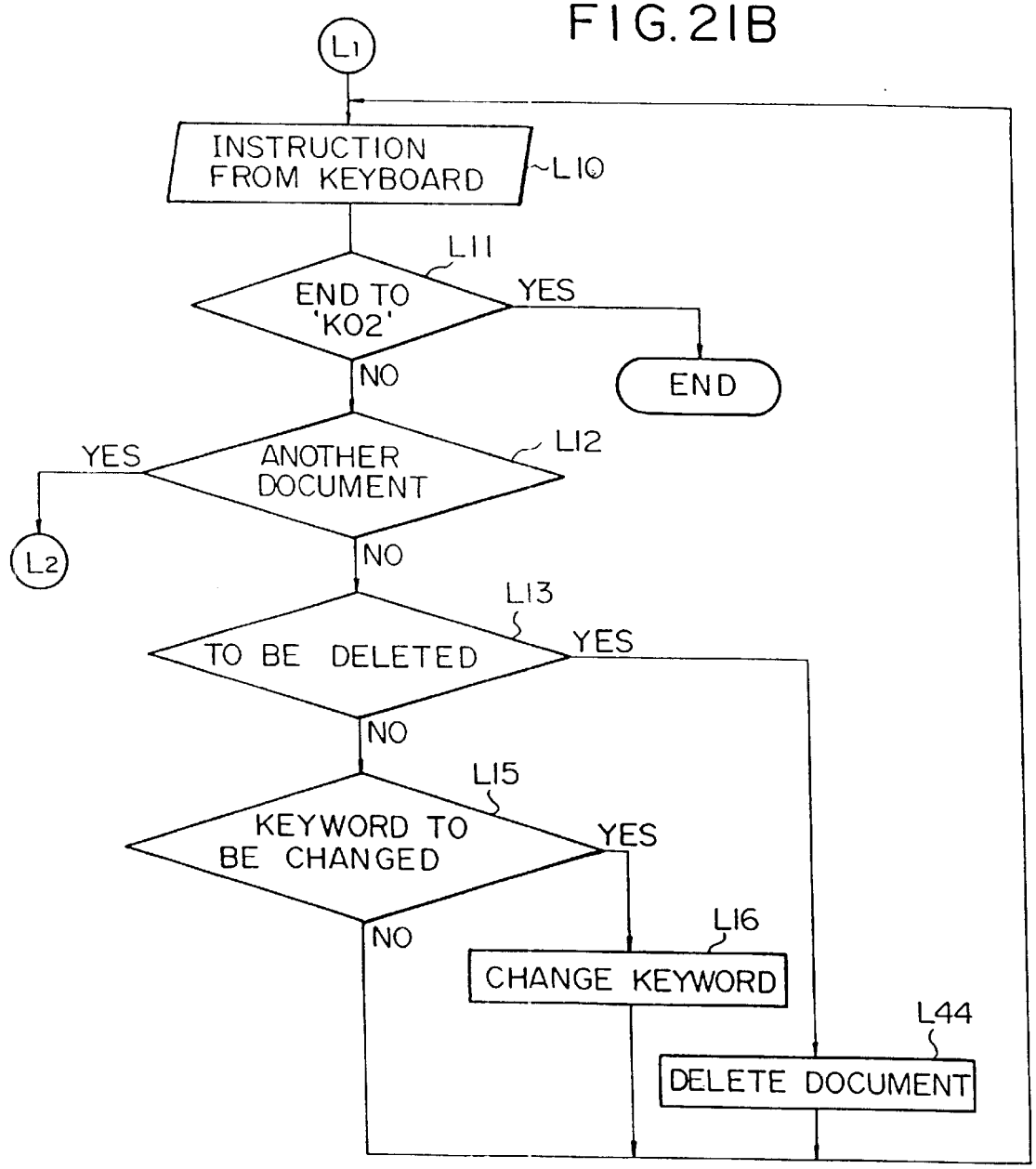

FIG. 22

| KEYWORD '1' | . . . . |
|---|---|
| KEYWORD '2' | . . . . |
| KEYWORD '3' | . . . . |
| KEYWORD '4' | . . . . |
| KEYWORD '5' | . . . . |

DISPLAYED: XX TIMES

PRINTED: XX TIMES

KEYWORD INAPPROPRIATE

SAVING PERIOD IS OVER

| DELETE | CHANGE | ANOTHER DOCUMENT | END |

IMAGE FILING SYSTEM FOR MEMORIZING IMAGES READ FROM A GIVEN DOCUMENT TOGETHER WITH SMALL CHARACTERIZING IMAGE

This is a continuation of Ser. No. 08/478,892, filed Jun. 7, 1995, abandoned, which is a continuation of Ser. No. 08/243,063, filed May 13, 1994, abandoned, which is a continuation of Ser. No. 08/016,491, filed Feb. 10, 1993, abandoned, which is a continuation of Ser. No. 07/900,544, filed Jun. 18, 1992, abandoned, which is a continuation Ser. No. 07/782,799, filed Oct. 24, 1991, abandoned, which is a continuation of Ser. No. 07/345,810, filed May 1, 1989, abandoned.

FIELD OF THE INVENTION

The present invention relates in general to image filing systems and, particularly, to an image filing system capable of reading an image on a given document, storing into memory means electrical data relating to the image read from the document and reading the data from the memory means for displaying an image represented by the data read from the memory means. More particularly, the present invention relates to a method of furnishing a document with auxiliary document identification data, in addition to main document identification data, identifying the document in an image filing system of the described nature. The main document identification data is provided typically in the form of a keyword assigned to the particular document, while the auxiliary document identification data is representative of a portion of the image read from the given document and indicative of a characterizing feature of the image.

BACKGROUND OF THE INVENTION

An image filing system is used with documents each composed of a plurality of pages, each page bearing image information. Such system is capable of allowing the operator access to any desired document by making a search for a single keyword or two or more keywords assigned to a particular document if the predetermined document name is unknown by the operator. Whether or not the documents listed on retrieval of the keyword or keywords includes the correct document the operator intends to view cannot be determined by the operator, however, unless the operator actually views each of the pages of the document on display. Is the image data is stored in a compressed form in the system, the image data retrieved must be processed to restore or extend the image data to its original form before the image represented by the data is displayed. A disproportionately large amount of time is required for such processing of the retrieved image data. This time is in addition to the time and labor which the operator is required to expend for reviewing each of the pages of the document.

These problems are ingeniously solved in an image filing system proposed in Japanese Provisional Patent Publications (Kokai) No. 61-224557 and No. 61-224558. In the image filing system therein disclosed, a "characterizing" image area of a document which represents a prominent feature of the document is designated at the time of registration of the document in the system. Consequently, only this characterizing image area of the document is displayed during successive inspection of the documents listed as a result of a keyword.

When there is an instruction signal entered to reference the documents listed as a result of a keyword search in known image filing systems of this type, it is required that a search be further made of the characterizing image area of each of the documents. This characterizing image area data is stored in compressed form. The data representative of the particular image area of the document is processed to restore the original state of the data before the image in the image area is to be displayed. An intricate procedure is required, however, for selectively extracting the data contained in the characterizing image area of the document and, in addition, there is a limitation in reducing the period of time required for such processing of the data.

SUMMARY OF THE INVENTION

It is accordingly an important object of the present invention to provide an improved image filing system capable of efficiently making a search for a given keyword.

It is another important object of the present invention to provide an improved image filing system having a keyword search function allowing retrieval of a target document in a significantly reduced period of time.

It is still another important object of the present invention to provide an improved image filing system in which image data representative of the whole image read from a document is stored in one data storage area of a memory and image data representative of a characterizing portion of the image is stored in another data storage area of the memory for use as auxiliary document identification data in searching for the particular document and displaying the image of the document.

Yet, it is still another important object of the present invention to provide an improved image filing system in which the data storage area of the memory, into which the image data representative of a characterizing portion of the image read from a document, can be reduced significantly and the data stored in the particular data storage area can be read from the memory in a significantly reduced period of time.

In accordance with a first outstanding aspect of the present invention, there is provided an image filing system which uses auxiliary document identification data main document identification data and for the identification of an image-bearing document. Such auxiliary document identification data is formulated to be representative of a portion of the image read from a given document and is indicative of a characterizing feature of the image read from the document, wherein main document identification data is provided typically in the form of a keyword assigned to particular document. Image data representative of the whole image read from the document are stored in one data storage area of a memory, and image data representative of the characterizing portion of the image are stored in another data storage area of the memory for use as auxiliary document identification data. When the documents accessed as a result of the searching on the basis of a keyword or keywords, the auxiliary document identification data is displayed for each of the documents in addition to the keyword or keywords assigned as the main document identification data to each of the documents listed on the display. This assists help the operator of the system select and call the target document from among the listed documents by allowing reference to the auxiliary document identification data as well as the main document identification data.

The auxiliary document identification data used in an image filing system according to the present invention is provided as part of the image data representing the image read from a given document but is stored in the memory without being compressed (or compacted). In contrast, the image information which is representative of the whole image of the document is stored in compressed form. For this reason, the auxiliary document identification data can be fetched from the memory faster than the image information representative of the whole image of a document. The auxiliary document identification data used in an image filing system according to the present invention is typically in the form of a pictorial or graphic image pattern characterizing a given image-bearing document. In contrast the main document identification data which is provided in the form of a keyword implemented by a sequence of alphanumerical characters, as is customary in the art.

The auxiliary document identification data used in an image filing system according to the present invention is useful for distinguishing one document from another when all of the documents have a common keyword as the main document identification data of each of the documents. Thus, in accordance with a second outstanding aspect of the present invention, there is provided an image filing system in which, when an operator enters a certain keyword in search of any target document, a search is automatically made for all the documents that bear the particular keyword as the main document identification data. If two or more documents are then found to have the keyword commonly assigned thereto, a routine program is executed to register auxiliary document identification data peculiar to each of such documents. Different and mutually discernible pieces of auxiliary document identification data are thus registered for two or more image-bearing documents which partake of a single keyword and which could not be discriminated from one another if the single keyword alone were relied on.

In accordance with still another outstanding aspect of the present invention, the auxiliary document identification data assigned to an image-bearing document, which forms part of the image data representative of the image picked up from the document, is reduced but is stored in the memory without compression of the data. The auxiliary document identification data, thus reduced in the amount of data, can therefore be used as it is in displaying the image represented by the auxiliary document identification data. The reduction of data is effected typically by reducing the degree of resolution or the size of the image to be displayed. The compression (or compaction) of data may be effected with a sequence of bits having the same logic value represented by a single code so as to reduce the total amount of data composed of a number of such like sequences. To restore original data from such compressed data in displaying the image represented by the data, the data compressed must be decoded and extended by having recourse to a time-consuming procedure before the image represented by the data is displayed.

As will be understood from the foregoing description, the auxiliary document identification data used in an image filing system according to the present invention is helpful for selecting a target document from among a plurality of candidate documents retrieved as a result of a search into a memory on the basis of a keyword or keywords. Such auxiliary document identification data is merely required to allow the operator of the system to visualize a characterizing portion of a whole image of a target document and, for this reason, need not provide a high degree of resolution when the image represented by the auxiliary document identification data is on display. In accordance with the third outstanding aspect of the present invention as above described, the auxiliary document identification data is reduced in the amount of data but is not processed for compression of data which would otherwise require an unnecessarily large amount of time.

BRIEF DESCRIPTION OF THE DRAWINGS

The features and advantages of an image filing system according to the present invention will be more clearly appreciated from the following description taken in conjunction with the accompanying drawings in which:

FIGS. 8A and 8B are flowcharts showing the details of a keyword input control subroutine program also included in the image data storage routine program illustrated in FIG. 5;

FIG. 14 is a flowchart showing the details of an image data write control subroutine program also included in the image data storage routine program illustrated in FIG. 5;

FIG. 15 is a flowchart showing the details of a keyword/ control data write control subroutine program further included in the image data storage routine program illustrated in FIG. 5;

FIGS. 16A and 16B are flowcharts showing the details of a data search subroutine program also included in the main routine program illustrated in FIG. 3;

FIG. 17A is a plan view showing a menu of selectable items which are to be displayed on the screen of the display unit of the system at the start of the data search subroutine program illustrated in FIGS. 16A and 16B;

FIG. 17B is a plan view showing an image frame which may be on display during execution of the data search subroutine program illustrated in FIGS. 16A and 16B;

FIGS. 21A and 21B are flowcharts showing the details of a file renewal subroutine program included in the utility subroutine program illustrated in FIG. 20;

FIG. 22 is a plan view showing a menu of selectable items which are to be displayed on the display unit of the system at the start of the file renewal subroutine program illustrated in FIGS. 21A and 21B.

DESCRIPTION OF THE PREFERRED EMBODIMENT

Description will be hereinafter made with reference to the drawings in regard to a preferred embodiment of an image filing system according to the present invention.

Figure 1:
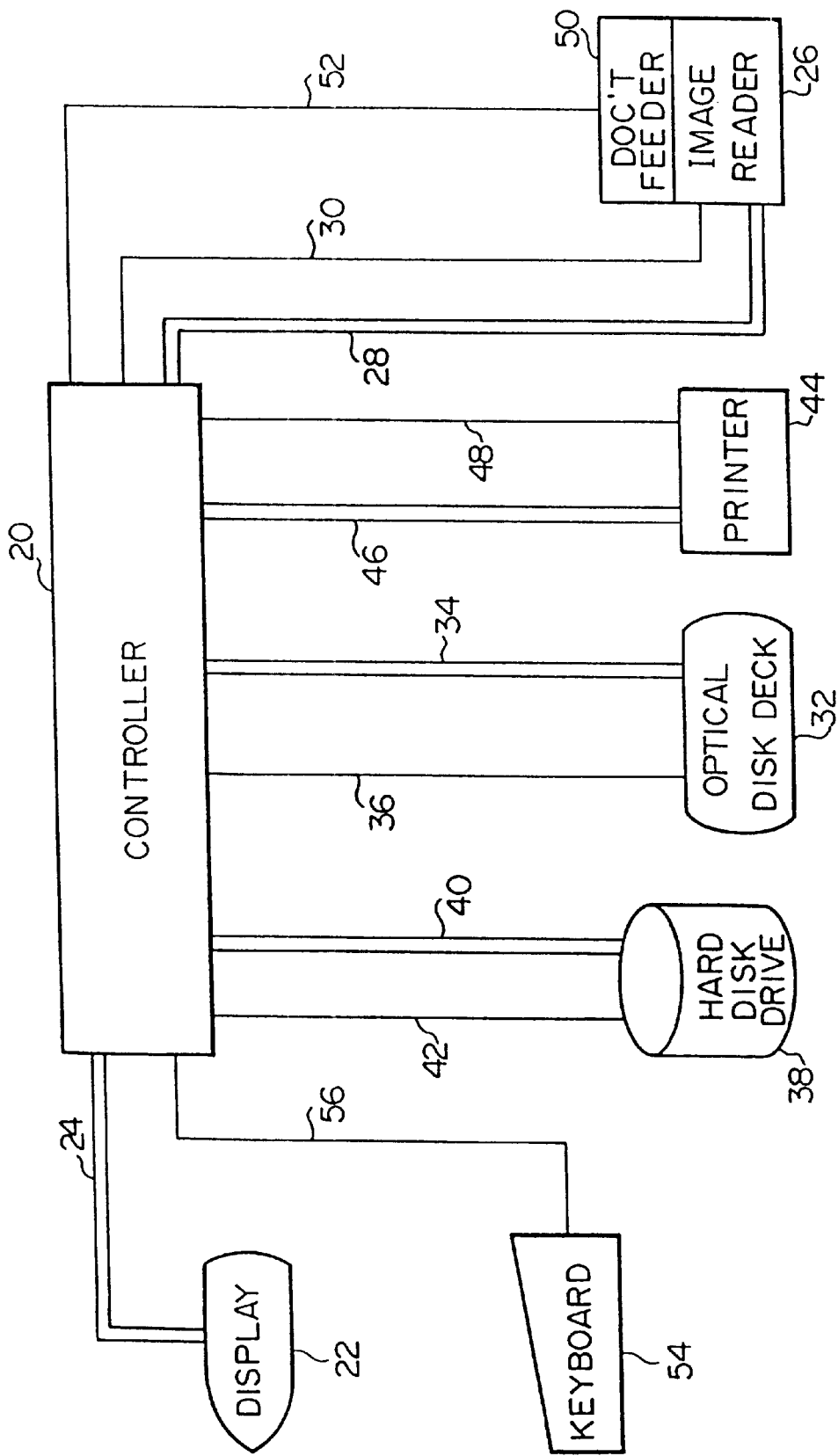
FIG. 1 is a diagram showing a representative example of the hardware architecture of an image filing system to which the present invention generally appertains.

Referring first to FIG. 1, an image filing system, to which the present invention generally appertains, includes a controller 20 connected to a display unit 22 through an image data bus 24. The display unit 22 is typically of the cathode ray tube (CRT) type. The controller 20 is further connected to an image reader 26, through an image data bus 28 and a command bus 30, an optical disk deck 32, through an image data bus 34 and a command bus 36, a hard disk drive unit 38, through an image data bus 40 and a command bus 42, and a printer 44, through an image data bus 46 and a command bus 48. Further connected to the controller 20 are an automatic document feeder 50, through a command bus 52, and a keyboard 54, through a command bus 56, as shown. The automatic document feeder 50 is provided in association with the image reader 26 and is used to feed a document to be optically scanned by the image reader 26 to generate image data representing the image borne on a document fed by the automatic document feeder 50.

Figure 2:
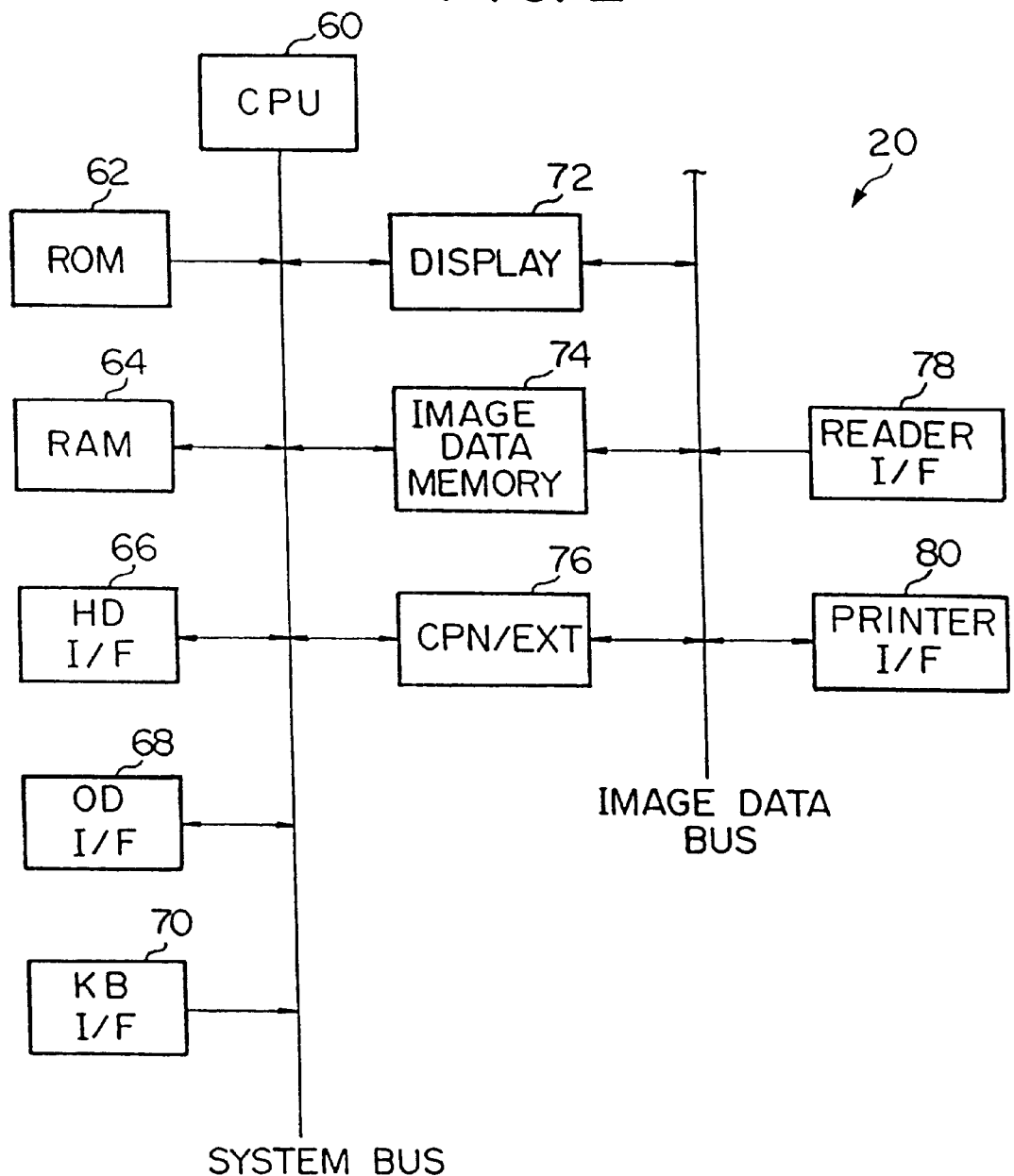
FIG. 2 is a block diagram schematically showing the general internal block configuration of the controller incorporated in the image filing system illustrated in FIG. 1.

In FIG. 2 is schematically shown the general internal block configuration of the controller 20 which forms part of the image filing system. As shown, the controller 20 comprises a central processing unit 60 connected through a system bus to a read-only memory 62 (ROM), a random-access memory 64 (RAM), a hard disk interface circuit 66 (HD I/F), an optical disk interface circuit 68 (OD I/F), and a keyboard interface circuit 70 (KB I/F). The central processing unit 60 is further connected through the system bus to a display block 72, an image data memory block 74, and a data compression/extension block 76. The display block 72, image data memory block 74, and data compression/extension block 76 are further connected, through an image data bus, to an image reader interface circuit 78 and a printer interface circuit 80.

The central processing unit 60, directed by the programs stored in the read-only memory 62, is predominant over all the phases and aspects of the operation to be performed in the system as a whole. Such phases and aspects of the operation to be governed by the central processing unit 60 include the operation to extract a particular characterizing image area of an image-bearing document and the operation to recognize alphanumerical characters on a document.

The hard disk interface circuit 66 is used to transfer to a designated destination the control data relating to the image data stored, or to be stored, on a hard disk 38 and the data representing a main keyword which may be entered through the keyboard 54 by the operator of the system. The optical disk interface circuit 68 transmits to an optical disk 32 the image data coded by the data compression/extension block 76 during storage of image data. For displaying a stored image, the optical disk interface circuit 68 transmits to the data compression/extension block 76 the coded image data supplied from the optical disk 32. The keyboard interface circuit 70 is used to transfer to the central processing unit 60 various pieces of data supplied from the keyboard 54.

The display block 72 is operative to display on the CRT display unit 22 the image represented by the image data received from image data memory block 74 through the data compression/extension block 76. The display block 72 has a display data storage memory incorporated therein. Display block 72 is further operative to store, in the display data storage memory, that image data transferred directly from the central processing unit 60 per se. On the other hand, the image data memory block 74 has a data storage image capacity for storing at least a page of data and is adapted to store the image data supplied through the image reader interface circuit 78. The image data thus stored in the image data memory block 74 is transferred either to the printer interface circuit 80 or to the data compression/extension block 76. The image data memory block 74 is further used to store image data extended by the data compression/extension block 76 and transferred to the memory block 74 and the image data representative of the characterizing image area scanned by the image reader 26.

Data is stored into or fetched from the image data memory block 74 directly under the control of the central processing unit 60. Image data is exchanged between the hard disk interface circuit 66, optical disk interface circuit 68 and data compression/extension block 76. It may be noted that the image data memory block 74 can be accessed either through the system bus or by way of the image data bus as will be seen from FIG. 2.

The data compression/extension block 76 is composed of a data compression section adapted to code image data and a data extension section adapted to decode coded image data into data of original form. The image data transmitted from the image data memory block 74 and supplied through the image data bus to the data compression/extension block 76 is transferred to the optical disk interface circuit 68 after the data received is coded by the data compression section of the block 76. Furthermore, the coded image data received from the optical disk interface circuit 68 through the system bus, is transferred through the image data bus to the image data memory block 74 after the data received is decoded by the data extension section of the block 76.

The image reader interface circuit 78 is operative to transfer to the image data memory block 74 the data representing an image from a document scanned by the image reader 26. Furthermore, the printer interface circuit 80 is operative to transfer to the printer 44 the image data fetched from the image data memory block 74 (or the display data storage memory of the display block 72) and controls the printer 44 to produce a printed output of the image information thus supplied to the printer 22.

Description will be hereinafter made regarding the various modes of operation of the image filing system embodying the present invention.

Figure 3:
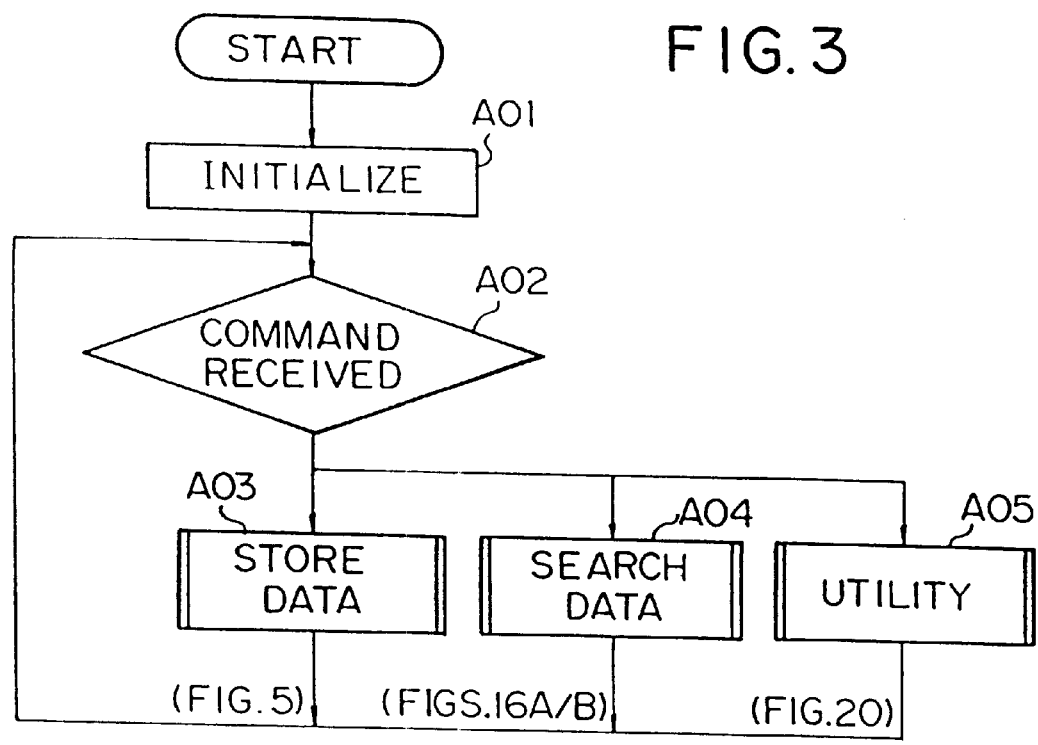
FIG. 3 is a flowchart showing a main routine program to be executed by the central processing unit which forms part of the controller illustrated in FIG. 2.
Figure 4:
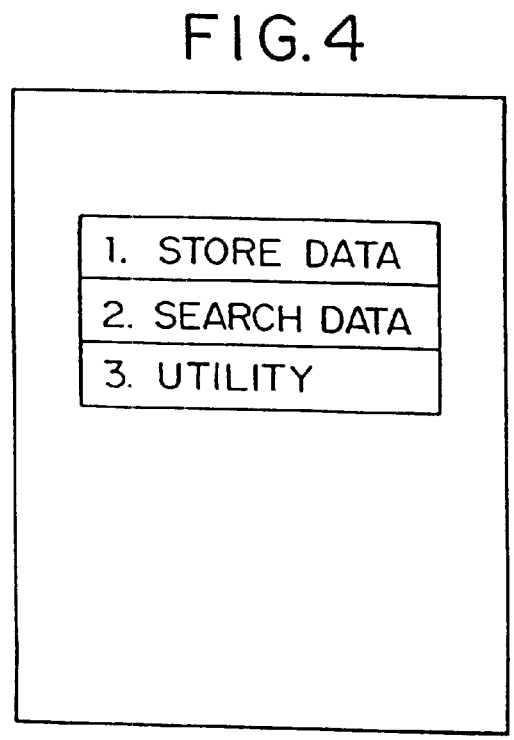
FIG. 4 is a plan view showing a menu of selectable items which are to be displayed on the screen of the display unit of the system at the start of the main routine program illustrated in FIG. 4.

FIG. 3 shows a main routine program to be executed by the central processing unit 60 which forms part of the controller 20, hereinbefore described with reference to FIGS. 1 and 2. Further shown in FIG. 4 is a menu of selectable items which are to be displayed on the screen of the CRT display unit 22 of the system at the start of the main routine program.

When the image filing system is initially switched on and energized, the central processing unit 60 executes step A01 to initialize various operating conditions and parameters of the system in accordance with preset default rules. When the initialization of such operating conditions and parameters of the system is complete, the central processing unit 60 proceeds to step A02 to check if there is a command input from the keyboard 54 demanding the central processing unit 60 to store new image data, search for any data stored, or execute any utility program.

Depending on the nature of the command which may thus be supplied from the keyboard 54, the central processing unit 60 then proceeds to a data storage subroutine program A03, a data search subroutine program A04, or a utility subroutine program A05 as shown. When there is a command demanding the execution of any of these subroutine programs, the name of the particular subroutine program is shown highlighted on the display unit 22, as shown in FIG. 4. Details of the data storage subroutine program A03, data search subroutine program A04, and utility subroutine program A05 will be hereinafter described with reference to FIGS. 5, FIGS. 16A and 16B, and FIG. 20, respectively.

Figure 5:
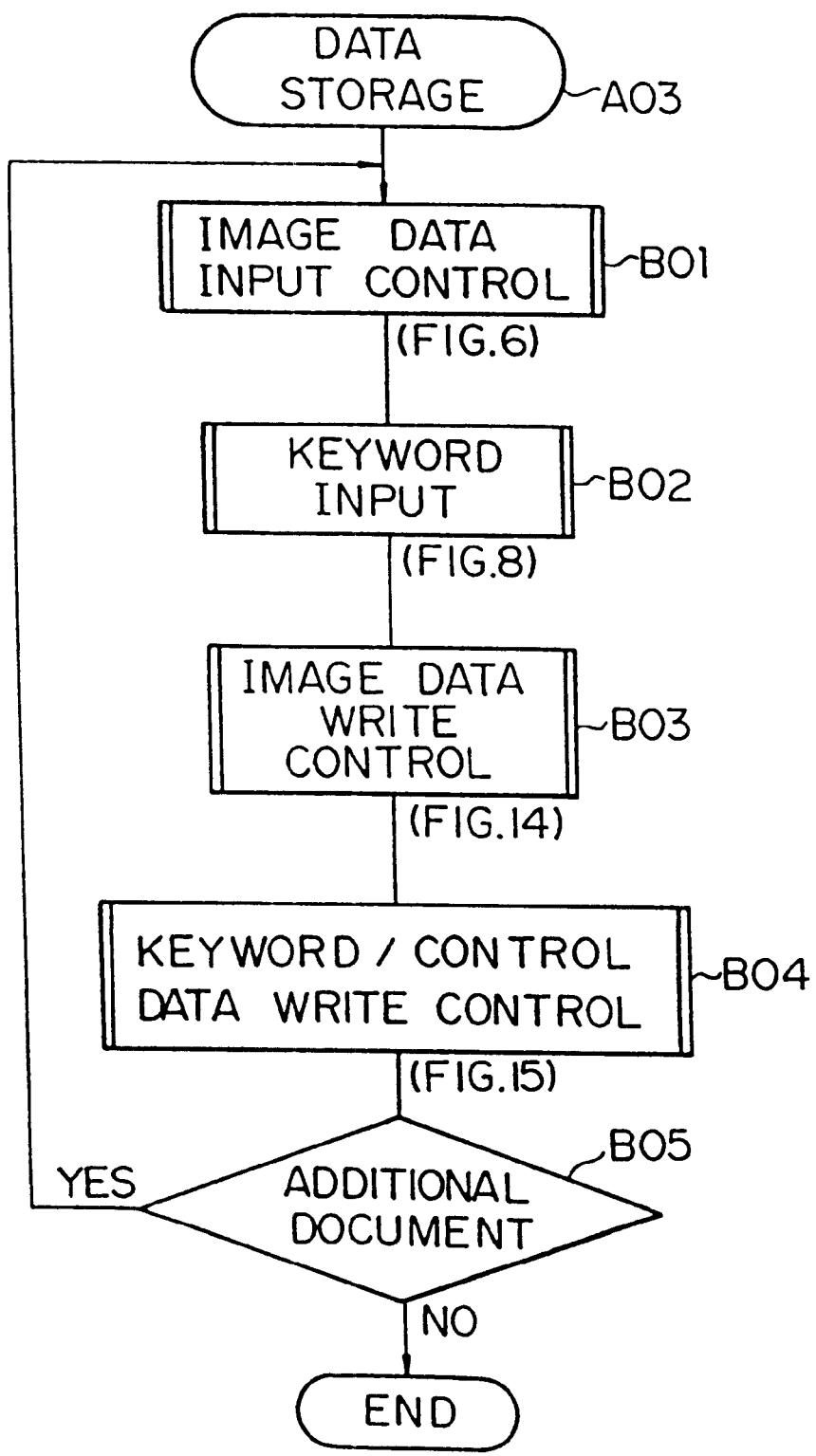
FIG. 5 is a flowchart showing the details of a data storage. subroutine program included in the main routine program illustrated in FIG. 3.

FIG. 5 shows the details of the data storage subroutine program A03 included in the main routine program hereinbefore described with reference to FIG. 3.

The data storage subroutine program A03 starts with an image data input control subroutine program B01 through which the image on a current document is read and. Thereupon, various parameters are selected for the display of the image on the screen of the CRT display unit 22. Details of this image data input control subroutine program B01 will be hereinafter described with reference to FIG. 6. The central processing unit 60 then proceeds to a keyword input control subroutine program B02, through which a keyword for retrieving a particular document stored in and to be fetched from the image data memory block 74 is to be assigned to the particular document. Details of this keyword input control subroutine program B02 will be hereinafter described with reference to FIGS. 8A and 8B.

The keyword input control subroutine program B02 is followed by an image data write control subroutine program B03, through which the image data generated by and supplied from the image reader 26 and stored in the image data memory 74 are coded by the data compression/extension block 76 and then stored into the optical disk 32 through the optical disk interface circuit 68. Details of this image data write control subroutine program B03 will be hereinafter described with reference to FIG. 14.

Subsequent to the image data write control subroutine program B03, the central processing unit 60 may proceed to a keyword/control data write control subroutine program B04, through which a keyword entered through the keyboard 54 for the retrieval of a particular document and the control data predominant over the document are to be written to the hard disk 38 through the hard disk interface circuit 66. The control data associated with a document may include data designating the location at which the image data is to be stored on the optical disk 32 and the share of disk capacity which the image data will require. Details of this keyword/control data write control subroutine program B04 will be hereinafter described with reference to FIG. 15.

The subroutine program B04 may be followed by decision step B05 at which is questioned whether or not there is any additional document which the operator of the system desires to have read by the image reader 26. If it is found at this step B05 that there is such a document, the central processing unit 60 reverts to the initial subroutine program B01 and may recycle the subroutine programs B01 to B04 until the answer for the step B05 is given in the negative. When the answer for the step B05 is thus given in the negative, the central processing unit 60 terminates execution of the data storage subroutine program A03 and may revert to the main routine program, hereinbefore described with reference to FIG. 3.

Figure 6:
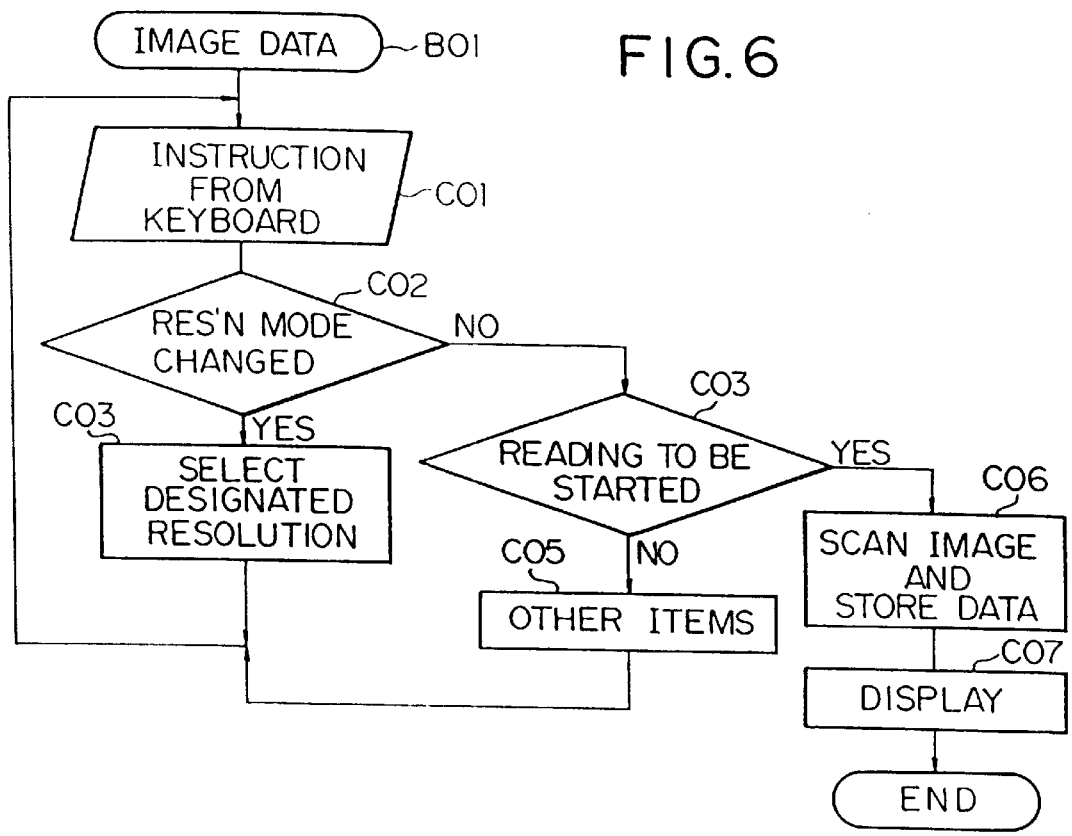
FIG. 6 is a flowchart showing the details of an image data input control subroutine program included in the image data storage routine program illustrated in FIG. 5.
Figure 7:
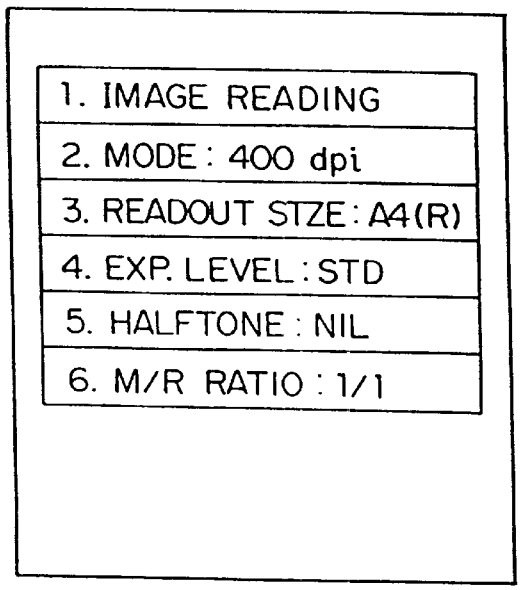
FIG. 7 is a plan view showing a menu of selectable items which are to be on display during execution of the image data input control subroutine program illustrated in FIG. 6.

FIG. 6. shows the details of the image data input control subroutine program B01 included in the image data storage routine program A03 hereinbefore described with reference to FIG. 5. This image data input control subroutine program B01 is executed in response to an instruction, through the keyboard 54 by the operator referencing the selectable items of the menu displayed on the screen of the CRT display unit 22. As illustrated in FIG. 7, the menu is herein assumed to include the following items:

(1) Image Reading
(2) Resolution Mode: 400 dpi
(3) Readout Size: A4(R)
(4) Exposure Level: Standard
(5) Magnification/Reduction Ratio: 1/1

Thus, the image data input control subroutine program B01 starts with step C01, at which the central processing unit 60 is responsive to an operator's instruction which may be entered through the keyboard 54 for each of the items on display. At this stage of operation, it is assumed that the document bearing the image information to be stored into the image filing system is either loaded into the automatic document feeder 50 associated with the image reader 26 or placed on the document table of the image reader 26 per se. The document loaded into the automatic document feeder 50 is conveyed onto the document table of the image reader 26 in response to an operator's instruction demanding the start of the image reading operation.

After the instruction received from the keyboard 22 is thus responded to as at step C01, it is checked at step C02 to see if the image resolution mode has been changed by the operator. It may thus be detected at this step C02 that the resolution mode previously selected has been changed to, for example, a high-density resolution mode setting the printing density to 400 dpi (dots per inch) or to a standard-density resolution mode setting the printing density to 200 dpi. If it is found at step C02 that this is the case, such a change in the image resolution mode is effected at step C03, whereupon the central processing unit 60 reverts to step C01 to check for another instruction which may be supplied from the keyboard 54. When there is another instruction supplied from the keyboard 54, the central processing unit 60 proceeds to step C02 for a second time to see if there is another change made with respect to the image resolution mode to be used.

If it is found at step C02 that there is no change made with respect to the image resolution mode, the step C02 is followed by step C04 to detect whether or not there is an operator's instruction demanding the image reader 26 to start reading the document placed on the document table of the image reader 26. If the answer for this step C04 is given in the negative, the central processing unit 60 proceeds to step C05 to prepare for the establishment of conditions conforming to the parameters selected for the individual items on display.

Thereupon, the central processing unit 60 for a second time reverts to step C01 to check for another instruction which may be supplied from the keyboard 54. When there is another instruction supplied from the keyboard 54, the central processing unit 60 proceeds to step C02 and possibly from the step C02 to step C04 to check if there is an operator's instruction demanding the image reader 26 to start reading the document. If there is such an operator's instruction present (the answer for this step C04 is given in the affirmative), then the central processing unit 60 proceeds to step C06 to activate the image reader 26 to scan the document on the document table. A beam of light bearing the image information picked up from the document on the table is now directed to an optoelectrical transducer (not shown) which forms part of the image reader 26. The optoelctrical transducer digitizes the image information to produce digital signals representing the image read from the document. These signals are supplied as image data, through the image reader interface circuit 78, to the image data memory block 74 of the controller 20 of the image filing system. As well known in the art, the image on the document is in this instance scanned in a horizontal, or primary, direction electrically by the optoelectric transducer and and in a vertical, or secondary, direction by the reciprocating movement of the image scanner.

The image data thus stored into the image data memory block 74 of the controller 20 is supplied through the data compression/extension block 76 to the display data storage memory incorporated in the display block 72. An image frame, or page, represented by the image data thus received from image data memory block 74 is displayed on the CRT display unit 22, at step C07, with the dots forming each unit image area decimated, if necessary, in a ratio corresponding to the selected magnification/reduction ratio. The purpose of thus decimating the dots forming each unit image area is to make it possible to display the whole image area of the document on the CRT display unit 22 despite a difference between the resolutions of the image reader 26 and the display unit 22. After execution of the step C07, the central processing unit 60 terminates the execution of the image data input control subroutine program B01 and may revert to the image data storage subroutine program A03, hereinbefore described with reference to FIG. 5.

Figure 8B:
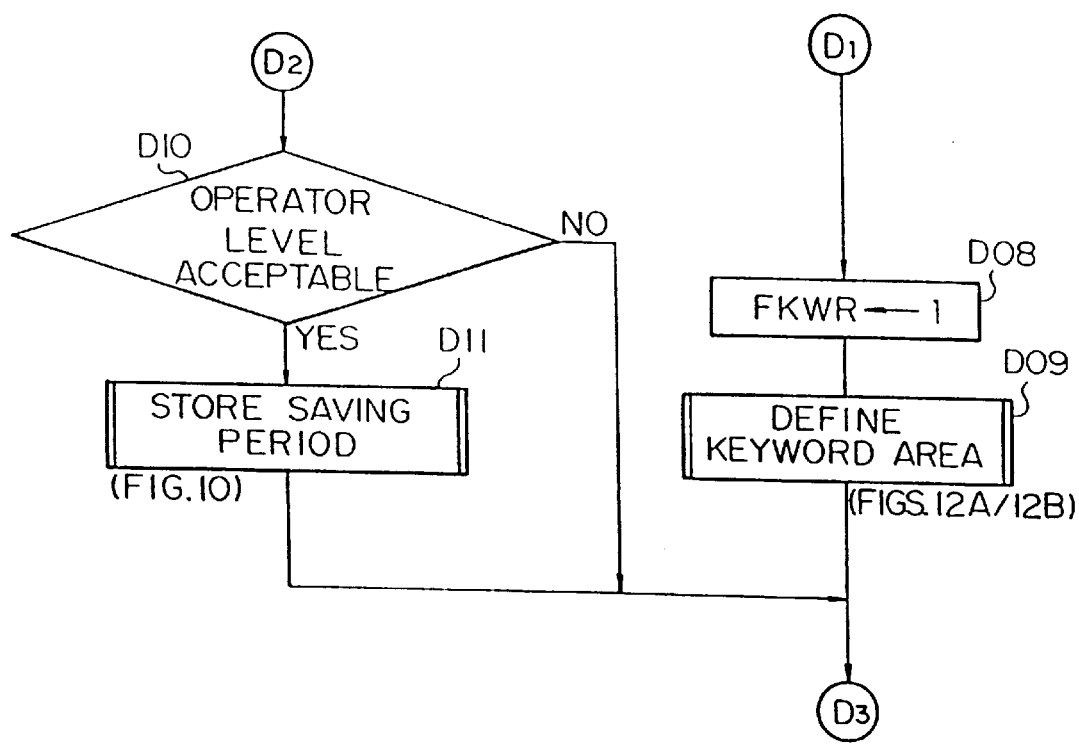
Figure 9:
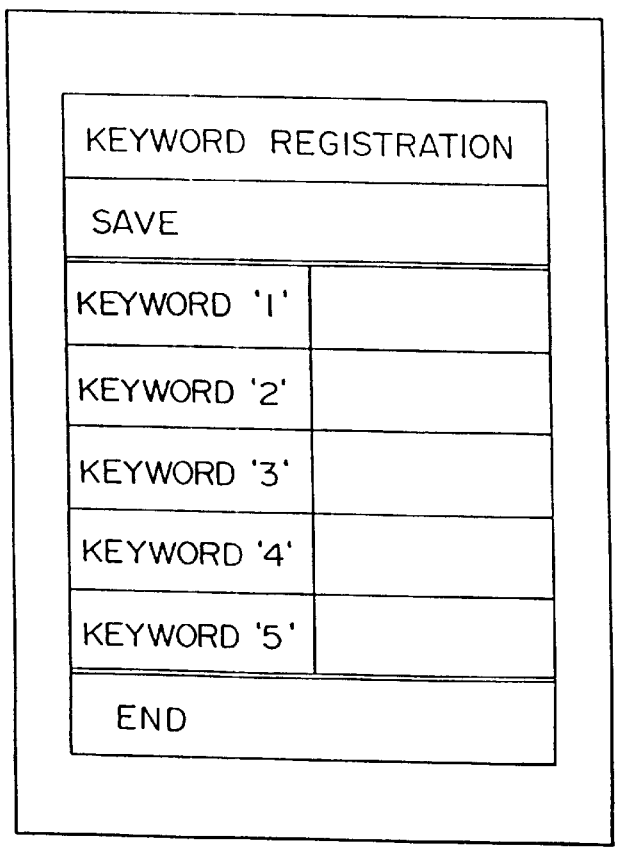
FIG. 9 is a plan view showing a menu of selectable items which are to be on display at the start of the keyword input control subroutine program illustrated in FIGS. 8A and 8B.

FIGS. 8A and 8B show the details of the keyword input control subroutine program B02, also included in the image data storage routine program A03, hereinbefore described with reference to FIG. 5. Further shown in FIG. 9 is a menu of selectable items which are to be displayed on the screen of the CRT display unit 22 at the start of the keyword input control subroutine program B02.

The keyword input control subroutine program B02 starts with step D01, at which an auxiliary keyword registration flag "FKWR" is reset to a logic "0" state. This auxiliary keyword registration flag "FKWR" is indicative of whether or not an auxiliary keyword indicating a "characterizing" image area of a document, representing a prominent feature of the document, is to be registered. Such an auxiliary keyword is stored independently of the image information picked up from a document and is used as ancillary document retrieval information in addition to the main keyword information in the form of a sequence of alphanumerical characters. This type of ancillary document retrieval information assigned to a particular document will be herein-after referred to as an auxiliary or image keyword. The auxiliary keyword registration flag "FKWR" reset to a logic "0" state at step D01 thus indicates that the image keyword associated with the document currently in use is not to be registered. The image keyword herein used may be in the form of a drawing, a graph, a table or a portion of such a graphic feature or any alphanumrical or symbolic feature.

Subsequent to step D01, the central processing unit 60 proceeds to step D02 to reset an image data save flag "FDS" to a logic "0" state. This image data save flag "FDS" is indicative of whether or not the period of time for which the image data generated from the current document is to be saved should be designated with respect to the particular image data. Thus, the image data save flag "FDS" reset to logic "0" state at step D02 indicates that the period of time for which the image data generated from the current document to be saved need not be designated.

The step D02 is followed by step D03 at which the central processing unit 60 is responsive to an instruction which may be received from the keyboard 54. The operator of the system may key in a keyword or two or more keywords for the current document while referencing the menu displayed on the screen of the CRT display unit 22, as illustrated in FIG. 9.

After a keyword or a plurality of keywords received from the keyboard 54 are thus responded to by the central processing unit 60 at step D03, it is checked at step D04 to see if entry of any information through the keyboard 54 is complete for the current document. The information which may be entered through the keyboard 54 for this step D04 may be, for example, the image keywords "1" to "5" as shown in FIG. 9. If it is found at step D04 that this is the case, the central processing unit 60 terminates the execution of this keyword input control subroutine program B02 and may revert to the image data storage subroutine program A03, hereinbefore described with reference to FIG. 5.

If it is found at step D04 that entry of information through the keyboard 54 is still in progress (the answer for the step D04 is given in the negative), it is checked at step D05 if the instruction received from the keyboard 54, as at step D03, is a request for registering an image keyword. If the answer for this step D05 is given in the negative, the central processing unit 60 proceeds to step D06 to check if there is any period of time designated for the saving of the image data to be read from the current document. This decision is made on the basis of the image data save flag "FDS" which is to be set to a logic "1" state when such a period of time is designated through the keyboard 54.

If it is found at step D06 that there is no period of time designated for the saving of the image data, the central processing unit 60 proceeds to step D07 to execute an ordinary procedure necessary for the registration of the keyword or keywords entered. On termination of such a procedure at step D07, the central processing unit 60 reverts to step D03 and may thus repeat the steps D03 to D07 if the answer for each of the steps D04 to D06 is given in the negative.

If it is found at step D05 that the instruction received from the keyboard 54, as at step D03, is a request for registering an image keyword, the central processing unit 60 proceeds to step D08 to set the image keyword registration flag "FKWR" to a logic "1" state. Subsequent to step D08, the central processing unit 60 executes an image keyword area defining subroutine program D09 to define an image keyword area specific to the current document, as the previously mentioned characterizing image area for the document. Details of this image keyword area defining subroutine program D09 will be hereinafter described with reference to FIGS. 12A and 12B.

On the other hand if it is found at step D06 that there is a period of time designated for the saving of the image data generated from the current document, the central processing unit 60 then proceeds to step D10 to confirm whether or not the "operator level" is acceptable. The "operator level" herein referred to is indicative of the degree of the operator's capability and/or the degree of the operator's experiences or skills required for the registration and saving of image information in the system under consideration. The operator level may be predetermined, for example, by for the status and office for each of the possible users of the system in an organization to which the uses belong. The data representing such criteria for determining the operator level is contained in the operator's identification code entered into the system when the system is initially booted up.

If it is found at step D10 that the operator level is not acceptable, the central processing unit 60 reverts to step D03. On the other hand, if it is found at the step D10 that the operator level is acceptable (the answer for the step D10 is given in the affirmative), the central processing unit 60 executes a saving period data storage subroutine program D11 to store on the hard disk 38 the data representing the designated period of time for the saving of the image data to be read from the current document. Details of this saving period data storage subroutine program D11 will be hereinafter described with reference to FIG. 10. After execution of the saving period data storage subroutine program D11, the central processing unit 60 also reverts to step D03.

Figure 8C:
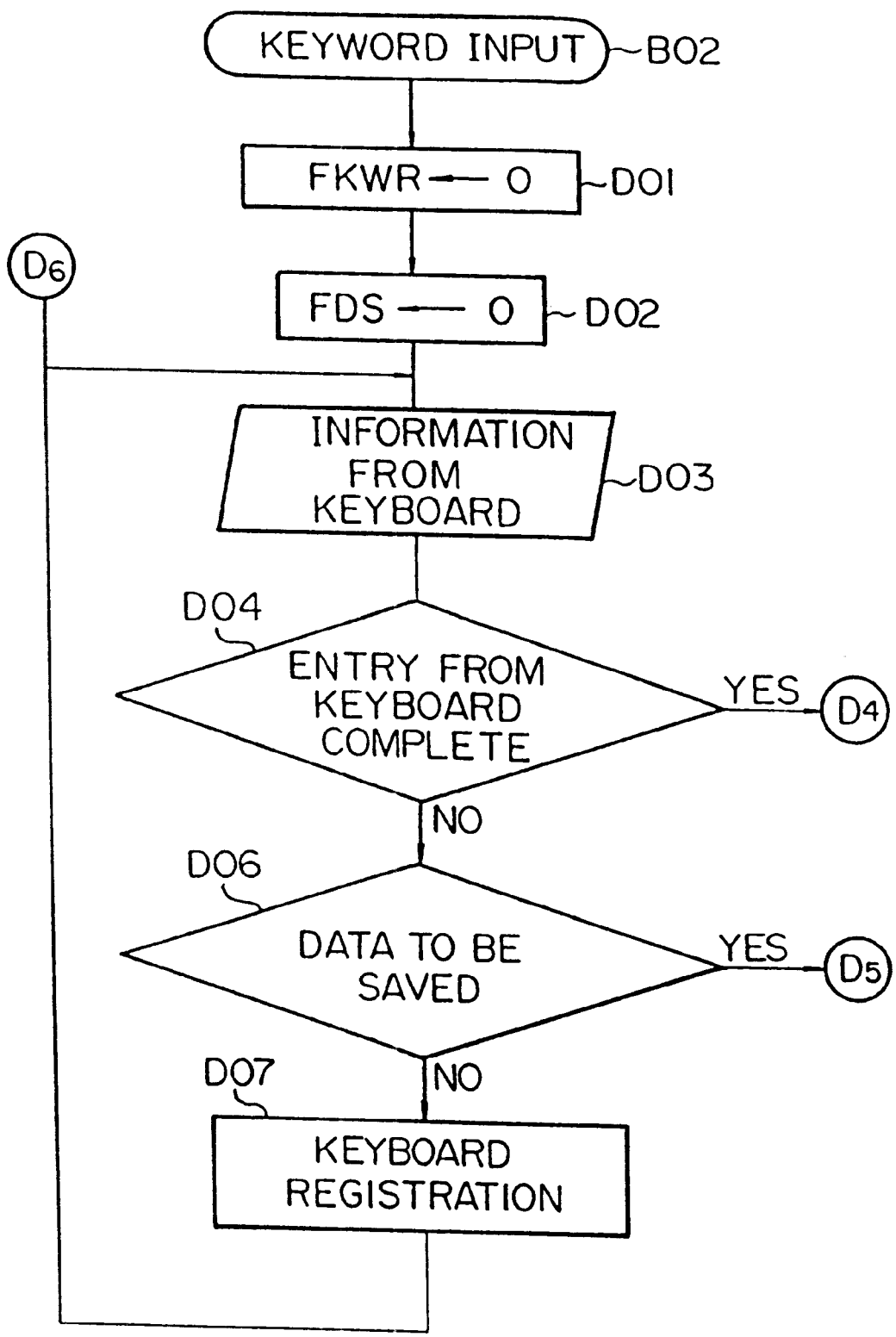
FIGS. 8C and 8D are flowcharts showing an alternative example of the keyword input control subroutine program illustrated in FIGS. 8A and 8B.
Figure 8D:
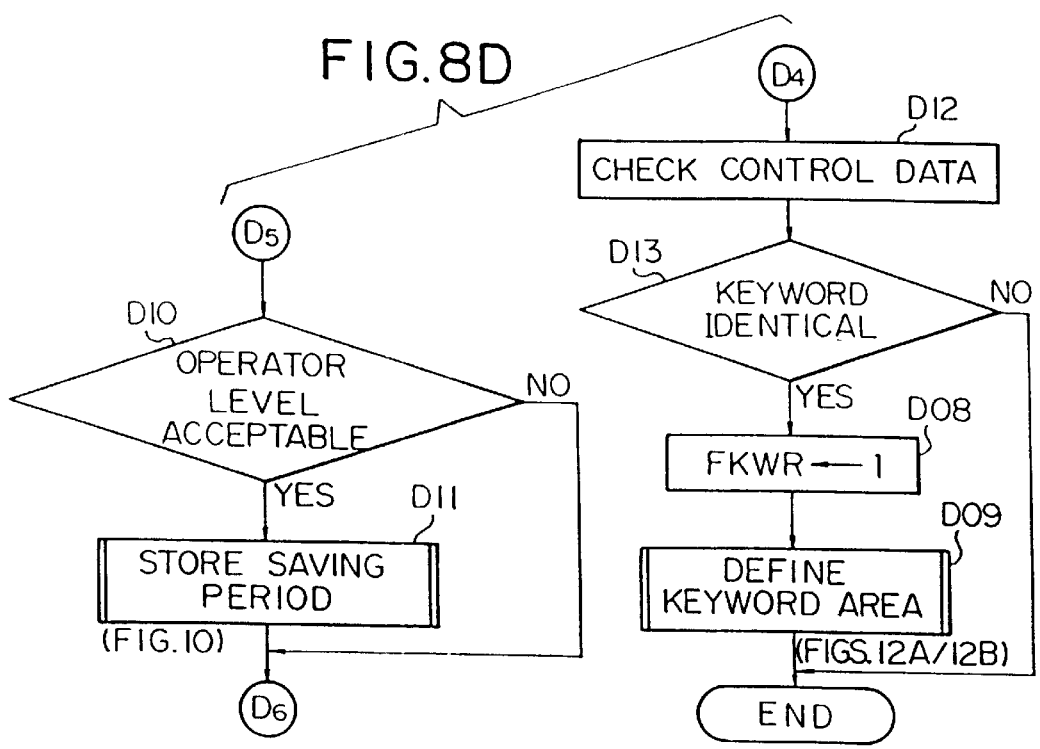

FIGS. 8C and 8D are flowcharts showing an alternative example of the keyword input control subroutine program illustrated in FIGS. 8A and 8B.

In the keyword input control subroutine program B02, the step D04 is followed directly by step D06 when it is found at step D04 that entry of information through the keyboard 54 is still in progress (the answer for the step D04 is given in the negative). Thus, when the answer for the step D04 is given in the negative, it is immediately checked at step D06 if there is any period of time designated for the saving of the image data to be read from the current document.

If it is found at step D04 that entry of information through the keyboard 54 is complete for the current document, the central processing unit 60 proceeds to step D12 to check the control data stored in the form of table data on the hard disk 38. Thereafter, it is detected at step D13 whether or not the main keyword, which has already been entered and stored on the hard disk 38, is identical with the keyword which is about to be loaded on the hard disk 38. If the answer for this step D13 is given in the negative, the central processing unit 60 terminates the execution of this keyword input control subroutine program B02 and may revert to the image data storage subroutine program A03, hereinbefore described with reference to FIG. 5.

If the answer for this step D13 is given in the affirmative, the the central processing unit 60 proceeds to step D08 to set the image keyword registration flag "FKWR" to logic "1" state. Subsequent to step D08, the central processing unit 60 executes an image keyword area defining subroutine program D09 to define an image keyword area specific to the document currently in use as in the subroutine program described with reference to FIGS. 8A and 8B. When it is found at step D06 that there is a period of time designated for the saving of the image data generated from the current document, the central processing unit 60 proceeds to step D10 to confirm whether or not the operator level is acceptable, as has also been described with reference to FIGS. 8A and 8B.

Figure 10:
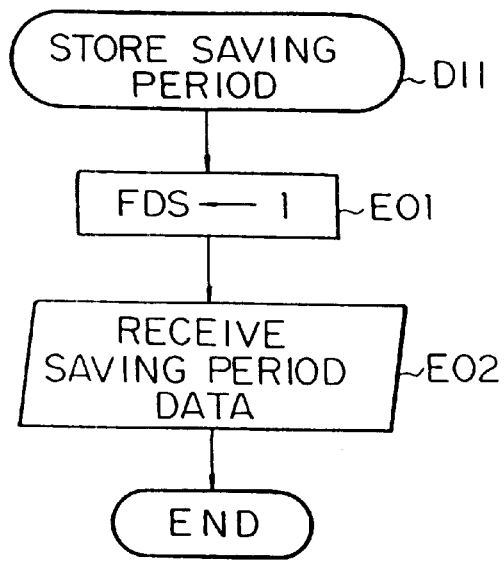
FIG. 10 is a flowchart showing details of an image data saving period data storage subroutine program included in the keyword input control subroutine program illustrated in FIGS. 8A and 8B.

FIG. 10 shows the details of the image data saving period data storage subroutine program D11 included in the keyword input control subroutine program B02, hereinbefore described with reference to FIGS. 8A and 8B. Illustrated in FIG. 11 is an image frame which may be displayed on the screen of the CRT display unit 22 after the period of time for which the image data, to be read from the current document to be saved, is designated during execution of the subroutine program D11.

The image data saving period data storage subroutine program D11 starts with step E01 to set the image data save flag "FDS" to logic "1" state. Subsequent to step E01, the central processing unit 60 proceeds to step E02 to receive the data representing the image data saving period of time designated by the operator of the system. The central processing unit 60, having executed the step E02 terminates the execution of the image data saving period data storage subroutine program D11 and may revert to the keyword input control subroutine program B02, hereinbefore described with reference to FIGS. 8A and 8B.

Figure 12A:
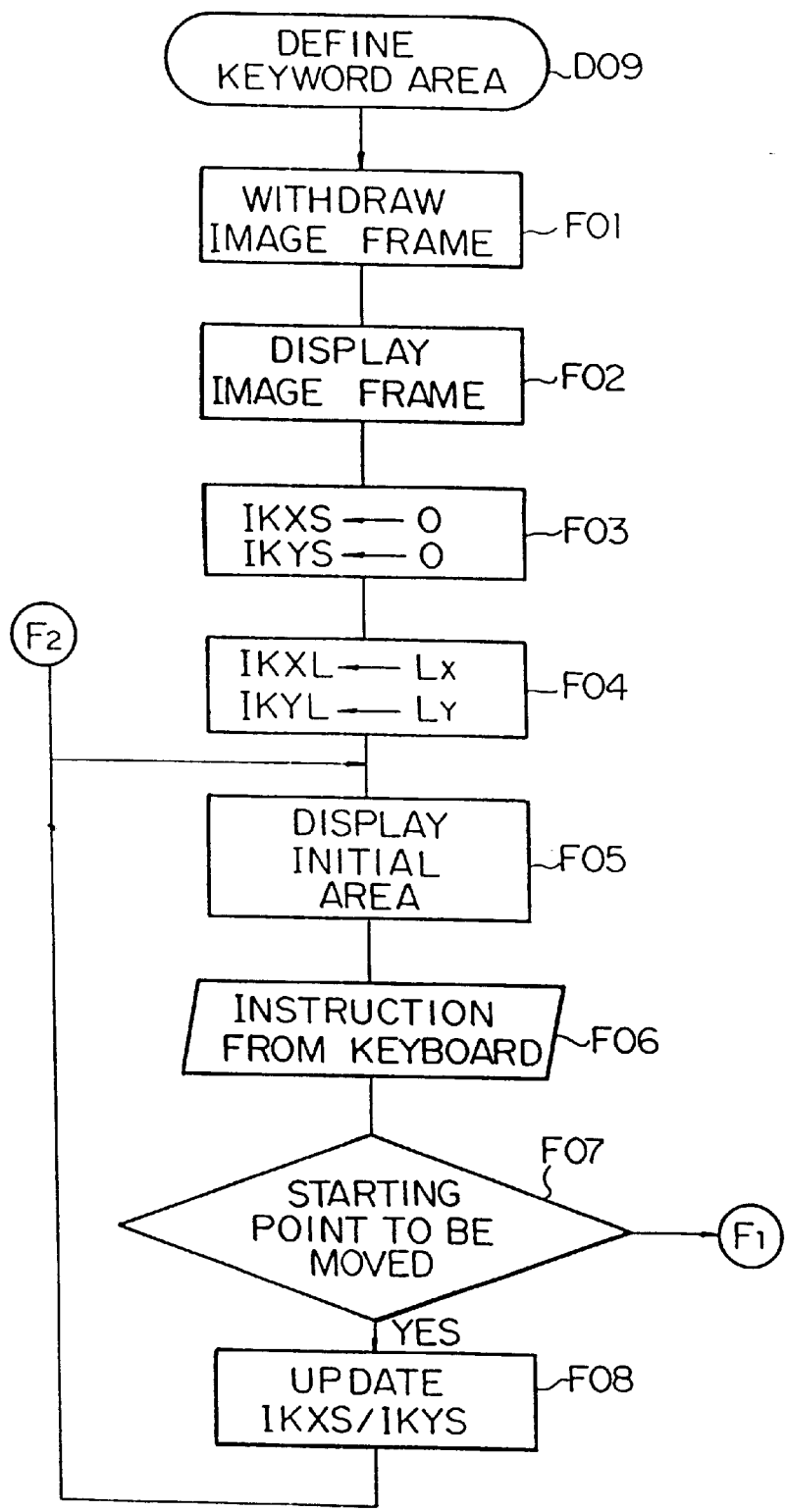
FIGS. 12A and 12B are flowcharts showing details of an image keyword area defining subroutine program included in the keyword input control subroutine program illustrated in FIGS. 8A and 8B.
Figure 12B:
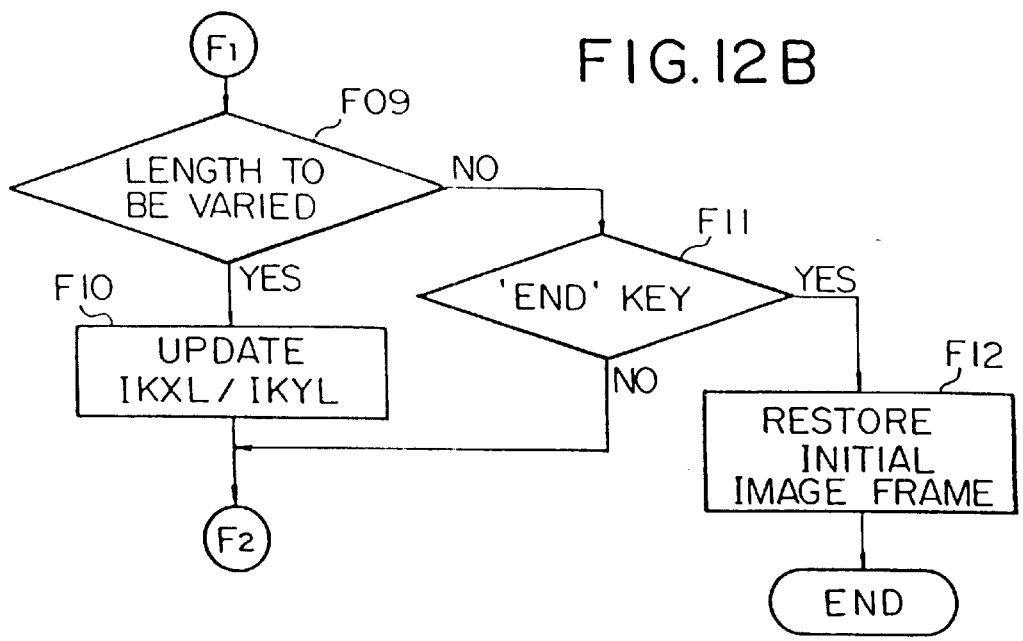
Figure 13:
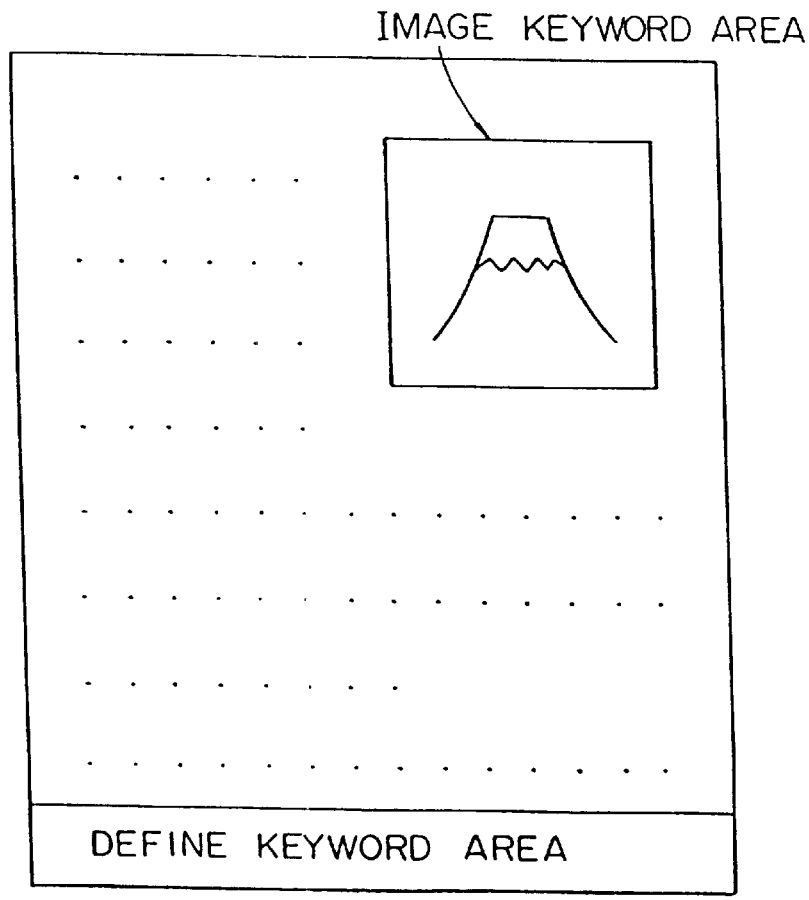
FIG. 13 is a plan view showing a frame of image which may be on display at the start of the image keyword area defining subroutine program illustrated in FIGS. 12A and 12B.

FIGS. 12A and 12B are flowcharts showing details of the image keyword area defining subroutine program D09 further included in the keyword input control subroutine program B02, hereinbefore described with reference to FIGS. 8A and 8B. Further shown in FIG. 13 is an image frame which is displayed on the screen of the CRT display unit 22 to prompt the operator to enter data for defining the image keyword area designated.

Figure 11:
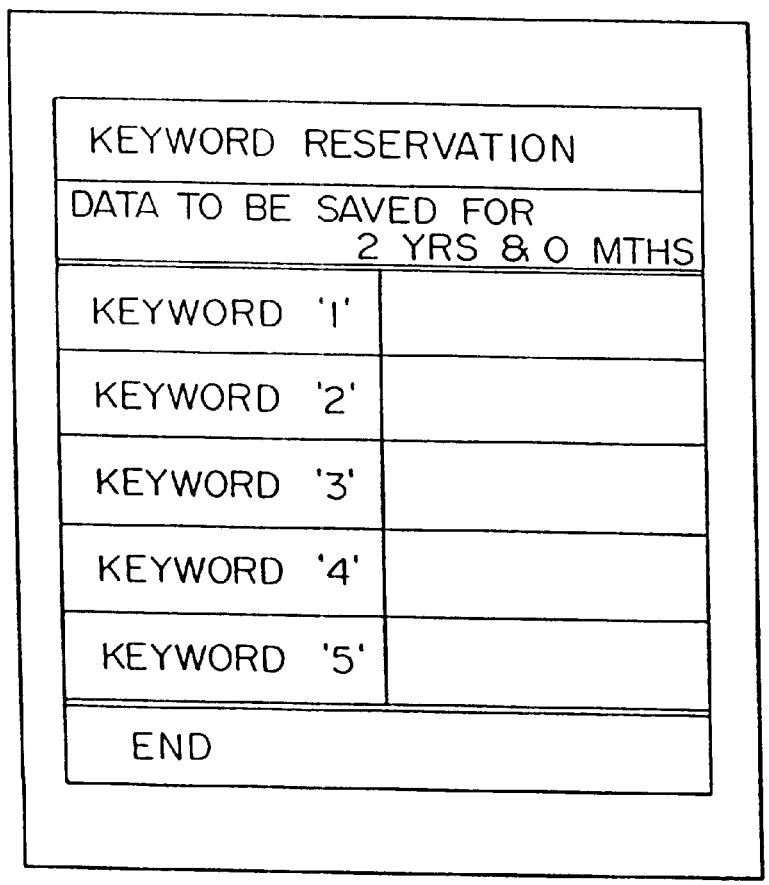
FIG. 11 is a plan view showing a menu of selectable items which are to be on display at the start of the image data saving period data storage subroutine program illustrated in FIG. 10.

The image keyword area defining subroutine program D09 starts with step F01 to withdraw from the screen of the CRT display unit 22 the image frame indicated in FIG. 11. The central processing unit 60 then proceeds to step F02 to display, on the screen of the CRT display unit 22, an image frame represented by the image data fetched from the display data storage memory of the display block 72, to which the image data read from the current document had been transferred from the image data memory block 74. The step F02 is followed by step F03, at which the x-axis and y-axis coordinate values IKXS and IKYS, indicative of the starting coordinate point of an image keyword area, are set each at a predetermined initial value of, for example, "0". The step F03 in turn is followed by step F04, at which the measurements IKXL and IKYL, indicative of the measurements from the starting coordinate point of the image keyword are set at predetermined initial values $L_X$ and $L_Y$, respectively.

With the numerical data representing the starting the coordinate values IKXS and IKYS and the measurements IKXL and IKYL thus initialized at steps F03 and F04, the central processing unit 60 proceeds to step F05 to display, on the screen of the CRT display unit 22, an image frame containing the image keyword area defined by these numerical data. Thereafter, the central processing unit 60 proceeds to step F06 and is responsive to an operator's instruction, which may be entered through the keyboard 54 by the operator of the system. Thus, if it is detected at step F07 that an operator's instruction is entered to request movement of the starting point of the image keyword, the step F07 is followed by step F08, at which either the x-axis coordinate value IKXS or the y-axis coordinate value IKYS of the starting coordinate point of the image keyword area currently on display is updated, viz., either incremented or decremented, and the image keyword area defined by the updated x-axis or y-axis coordinate value IKXS or IKYS is displayed on the screen of the CRT display unit 22.

If it is detected at step F09 that an operator's instruction is entered to increase or decrease the measurement of the image keyword area from the starting point in the x-axis or y-axis direction, the initial numerical value of either the measurement IKXL or the measurement IKYL of the image keyword area currently on display is either incremented or decremented, and the image keyword area defined by the updated measurement IKXL or IKYL is displayed on the screen of the CRT display unit 22 as at step F10. Illustrated in FIG. 13 is an example of the image frame which is thus finally defined through execution of the steps F07 and F08 and steps F09 and F10 and displayed on the screen of the CRT display unit 22.

The movement of the starting point of an image keyword area or the alteration of the x-axis and y-axis measurements may be effected through concurrent manipulation of a "move" request key or a "change length" request key and any of the cursor keys similar to those provided on an ordinary keyboard of, for example, a personal computer.

When it is then detected at step F11 that an operator's instruction is entered through the keyboard 54 to put an end to the image keyword area defining operation with, for example, an "end" key depressed on the keyboard 54, the central processing unit 60 proceeds to step F12 to restore the image frame of FIG. 11 on the screen of the CRT display unit 22. The central processing unit 60 then terminates the execution of the image keyword area defining subroutine program D09 and may revert to the keyword input control subroutine program B02, hereinbefore described with reference to FIGS. 8A and 8B. Subsequent to step F08 or step F10 or when it is found at step F11 that an operator's instruction to put an end to the image keyword area defining operation is not entered, the central processing unit 60 returns to step F05 and may repeat any of the loops formed by the steps F09 to F11 until it is finally determined at step F12 that the defining of the image keyword area is complete.

FIG. 14 shows the details of the image data write control subroutine program B03, also included in the image data storage routine program A03, hereinbefore described with reference to FIG. 5.

The image data write control subroutine program B03 starts with step G01 at which the image data which has been stored in the image data memory block 74 is transferred to the data compression/extension block 76 and is coded and compressed therein. Subsequently, the central processing unit 60 proceeds to step G02 to calculate the address at which the image data is to be stored on the optical disk 32. The starting address to be thus assigned to the image data to be registered is immediately subsequent to the address assigned to the image data which was last stored on the optical disk 32.

The step G02 is followed by step G03, at which the image data which has been coded and compressed by the pieces of data compression/extension block 76 is transferred, through the optical disk interface circuit 68, and stored on the optical disk 32 successively in a sequence starting with the the address calculated at step G02. The central processing unit 60 then proceeds to step G04, at which the final address assigned to the image data thus stored on the optical disk 32 is extracted for storage as control data on the hard disk 38.

FIG. 15 shows the details of the keyword/control data write control subroutine program B04 further included in the image data storage routine program A03, hereinbefore described with reference to FIG. 5.

The keyword/control data write control subroutine program B04 starts with step H01 to check if the image keyword registration flag "FKWR" is set to a logic "1" state. The image keyword registration flag "FKWR" of a logic "1" state indicates that the period of time for which the image data generated from the current document to be saved should be designated. If the answer for this step H01 is given in the affirmative, the central processing unit 60 proceeds to step H02 to calculate the starting address at which the image data is to be stored on the optical disk 32. Subsequently, it is detected at step H03 whether or not the high-density resolution mode is currently selected, providing a printing density of 400 dpi. The central processing unit 60 then proceeds to step H04 or step H05 to load on the optical disk 32 the image data both stored in the image data memory block 74 and contained in an image area corresponding to the area defined by the coordinate values IKXS and IKYS and measurements IKXL and IKYL at steps F08 and F10 of the image keyword area defining subroutine program D09 (FIGS. 12A and 12B). If, in this instance, it is found at step H03 that the high-density resolution mode is currently selected (the answer for the step H03 is given in the affirmative), the step H03 is followed by step H04, at which the image data is transferred to the optical disk 32, through the optical disk interface circuit 68, with the dots forming each unit image area decimated in a ratio corresponding to the selected magnification/reduction ratio. On the other hand, if the answer for the step H03 is given in the negative, then the step H03 is followed by step H05, at which non-decimated image data is transferred to the optical disk 32 through the optical disk interface circuit 68. As has been noted, the purpose of thus decimating the dots forming each unit image area of the image to be stored on the optical disk 32 is to display the whole image area of the document on the CRT display unit 22.

It may be further added that the image data contained in the image area corresponding to the area defined by the coordinate values IKXS and IKYS and measurements IKXL and IKYL, as above described, is stored as image keyword data on the optical disk 32 in a memory area such as, for example, a page or a filing area different from the memory area where the ordinary image data is stored. It may also be noted that the image keyword data is stored on the optical disk 32 without being compressed in the data compression/extension block 76. This is because of the fact that the area in which the image keyword is to be displayed on the screen of the display unit 22 ordinarily has a relatively small size requiring a relatively small share of the total data storage capacity available in the optical disk 32. The image keyword data being thus uncompressed when the data is stored on the optical disk 32, such data need not be decoded and extended when the image keyword represented by the data is displayed and can therefore be processed in a significantly short period of time.

It may be further added that, while the dots forming the image keyword data to be transferred to the optical disk 32 are decimated only when the high-density resolution mode is selected, the decimation of the dots forming such data may be effected to reduce the density resolution if the ordinary density or any other density is selected for the display of the image keyword.

Subsequent to the step H04 or step H05, the central processing unit 60 proceeds to step H06 to fetch the final address assigned to the image keyword data which has thus been stored on the optical disk 32. The step H06 is followed by step H07, at which each of the numerical values indicating the count numbers $N_P$ and $N_D$ for printing and displaying is reset to "0". This step H07 is executed also when it is found at step H01 that the image keyword registration flag "FKWR" is set to a logic "1" state (the answer for the step H01 is given in the negative).

Having executed the step H07, the central processing unit 60 proceeds to step H08 to calculate the starting address at which the control data associated with the image data which has been stored on the optical disk 32 as has been described with reference to FIG. 14, is to be stored on the hard disk 38. The step H08 is followed by step H09, at which the control data is now transferred to the hard disk 38 by way of the hard disk interface circuit 66, whereupon the central processing unit 60 puts an end to execution of the keyword/control data write control subroutine program B04 and may revert to the image data storage routine program A03, herein-before described with reference to FIG. 5.

The control data stored on the hard disk 38 at step H09, is formulated in the form of table data and includes:

(1) image keyword registration flag (FKWR),
image keyword start track (IKXS),
image keyword end track (IKYS),
x-axis measurement of image keyword (IKXL),
y-axis measurement of image keyword (IKYL),
(2) image area start track (IKXS),
image area end track (IKYS),
dot density,
x-axis measurement of image area (IKXL),
y-axis measurement of image area (IKYL),
manner of data compression,
(3) image data save flag (FDS),
period of time for saving image data,
count number for printing ($N_P$),
count number for displaying ($N_D$),
date of data reservation,
keyword "1",
keyword "2",
keyword "3",
keyword "4",
keyword "5".

Figure 16A:
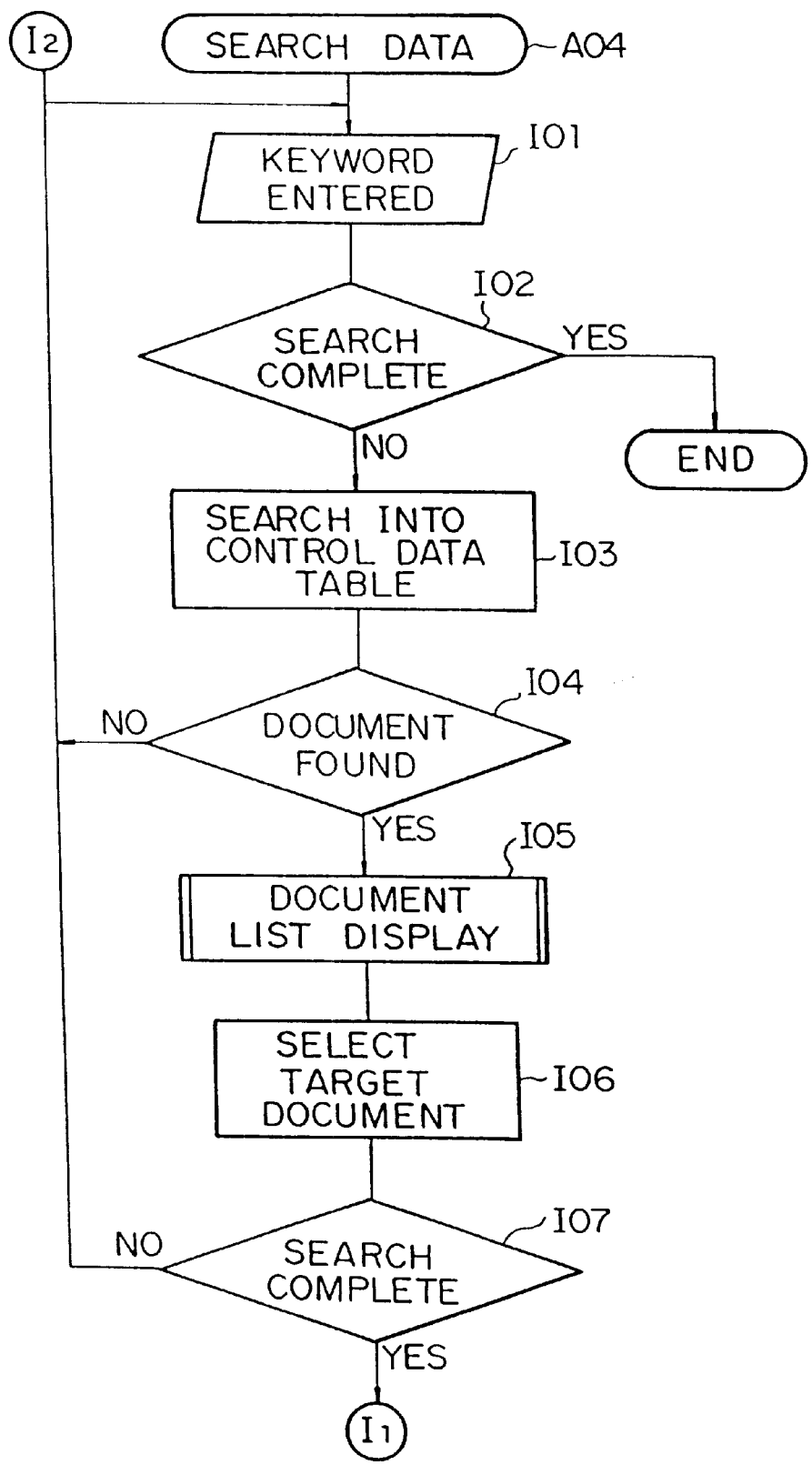

FIGS. 16A and 16B show the details of the data search subroutine program A04, also included in the main routine program, hereinbefore described with reference to FIG. 3. Shown in FIG. 17A is a menu of selectable items which are to be displayed on the screen of the CRT display unit 22 of the system at the start of the data search subroutine program A04. FIG. 17B further shows an image frame which may be on display during execution of the data search subroutine program A04.

The data search subroutine program A04 starts with step I01, at which the central processing unit 60 is responsive to a main keyword which may be entered through the keyboard 54 by the operator of the system. The central processing unit 60 then proceeds to step I02 to check if there is an operator's instruction entered through the keyboard 54 to put an end to the operation to search for a document. If it is found at this step I02 that there is such an instruction entered through the keyboard 54, the central processing unit 60 terminates execution of the data search subroutine program A04 and may revert to the main routine program hereinbefore described with reference to FIG. 3.

If it is found at step I02 that there currently is no instruction to terminate the search for a document, the central processing unit 60 proceeds to step I03 to search into the control data table stored on the hard disk 38 for the document to which the main keyword entered is assigned. It is then detected at step I04 whether or not the target document is discovered. If it is determined at this step I04 that the target document is not found (the answer for the step I04 is given in the negative), the central processing unit 60 reverts to step I01 and may repeat the loop of the steps I01 to I04.

When it is thereafter determined that the document represented by the main keyword entered is discovered, then the central processing unit 60 proceeds to a document list display subroutine program I05 to display the list of the main keywords for the documents, including the target document, on the screen of the CRT display unit 22. The operator of the system will then select the target document from among the documents listed on the screen of the display unit 22 and enter an instruction to select the particular document. The central processing unit 60 is thus responsive to this instruction at step I06, and thereupon proceeds to step I07 to check if there is an operator's instruction entered through the keyboard 54 to put an end to the document search operation. If it is found at this step I07 that there is no such instruction entered through the keyboard 54, the central processing unit 60 also reverts to step I01 and may repeat the loop of the steps I01 to I04.

When it is found at step I07 that there is an instruction to put an end to the document search operation entered through the keyboard 54, then the central processing unit 60 proceeds to step I08 to read from the optical disk 32 the image data associated with the control data for the document selected at step I06. The image data thus fetched from the optical disk 32 is transmitted through the optical disk interface circuit 68, to the data compression/extension block 76 and is thereby decoded and extended. The decoded image data is transferred to the image data memory block 74 and the image represented by the data is displayed on the screen of the CRT display unit 22. Shown in FIG. 17B is an example of a frame of image which may thus be displayed on the CRT display unit 22.

After the image of the document under consideration is displayed on the CRT display unit 22 in this manner, the central processing unit 60 proceeds to step I10 to update the count number $N_D$ for displaying to the image frame currently on display and the updated count number $N_D$ is stored as part of the control data in the hard disk 38 through the hard disk interface circuit 66. If it is desired by the operator of the system to produce a printed version of the image on display, an instruction to such an effect will be entered through the keyboard 54 at step I11. The central processing unit 60 is responsive to this instruction at step I12 and updates the count number $N_P$ at step I13 for printing to the image frame to be printed. Subsequently, the image data stored in the image data memory block 74 is transmitted, through the printer interface circuit 80, to the printer 44 of the system, and the image represented by the data is printed at step I14.

Figure 18:
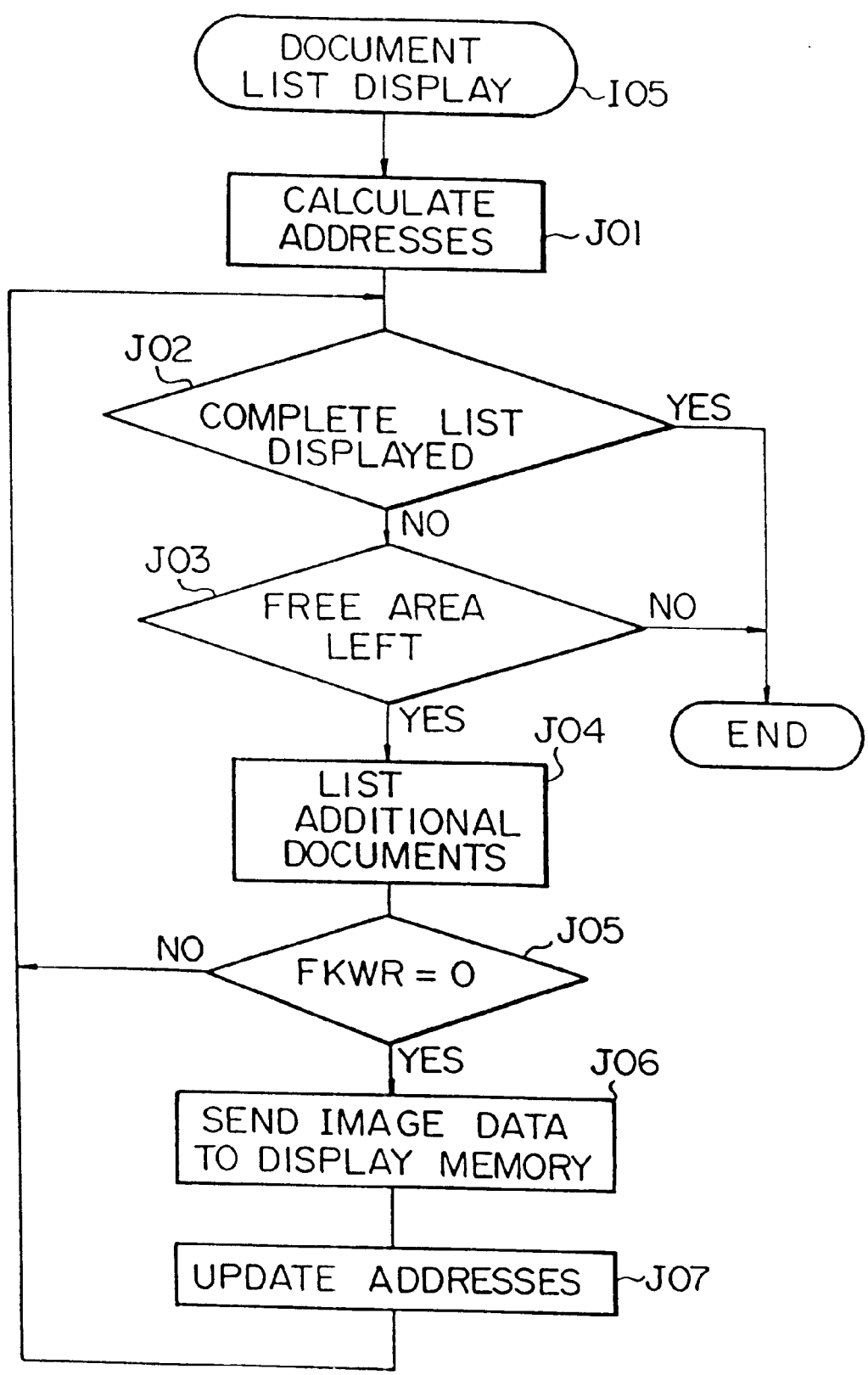
FIG. 18 is a flowchart showing the details of a document list display subroutine program included in the data search subroutine program illustrated in FIGS. 16A and 16B.
Figure 19:
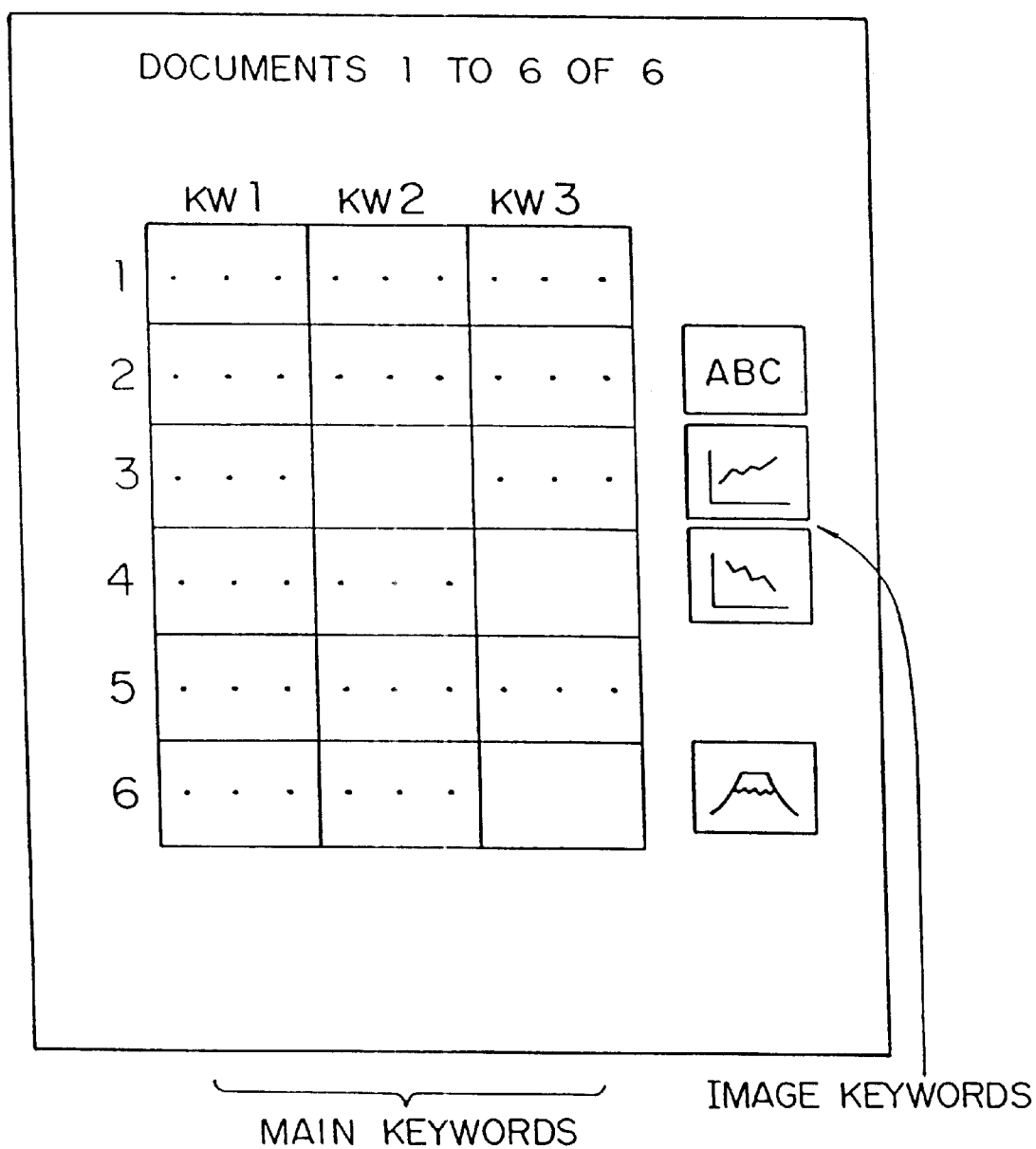
FIG. 19 is plan view showing an image frame indicating the main keywords and auxiliary or image keywords associated with the documents listed on the display unit of the system during execution of the document list display subroutine program illustrated in FIG. 18.

FIG. 18 shows the details of the document list display subroutine program I05, included in the data search subroutine program A04, hereinbefore described with reference to FIGS. 16A and 16B. Shown in FIG. 19 is an image frame indicating the main keywords and image keywords associated with the documents listed on the screen of the CRT display unit 22 of the system during execution of the document list display subroutine program I05.

The document list display subroutine program I05 starts with step J01 to calculate addresses at which the list of keywords for the documents, including the target document, is to be displayed on the screen of the CRT display unit 22. The central processing unit 60 then proceeds to step J02 to check if the complete list of the main keywords for the documents including the target document has been displayed on the CRT display unit 22. If the answer for the step J02 is given in the affirmative, the central processing unit 60 terminates execution of this document list display subroutine program I05 and may revert to the data search subroutine program A04, described with reference to FIGS. 16A and 16B.

If there remains a document which has been retrieved but which is not yet been listed on the display unit 22, the answer for the step J02 is given in the negative. Subsequently, the step J02 is followed by step J03 at which is detected whether or not there is a free area available on the screen of the CRT display unit 22. If it is determined that there is no free area left on the screen of the display unit 22 and accordingly (the answer for the step J03 is given in the negative), the central processing unit 60 also terminates execution of this document list display subroutine program I05 and may revert to the data search subroutine program A04.

If it is found at step J03 that there remains a free area available on the screen of the CRT display unit 22 (the answer for the step J03 is given in the affirmative), the step J03 is followed by step J04 at which the main keyword or keywords representative of the additional document or documents are listed on the CRT display unit 22. Subsequent to step J04, the central processing unit 60 proceeds to step J05 to detect whether or not the image keyword registration flag "FKWR" is set to a logic "1" state. If the answer for this step J05 is given in the negative, the central processing unit 60 reverts to step J02 to repeat the loop of the steps J02 to J05 or terminate execution of this subroutine program I05.

On the other hand, if it is determined at step J05 that the image keyword registration flag "FKWR" is set to a logic "1" state (the answer for the step J05 is given in the affirmative), the central processing unit 60 proceeds to step J06 to read from the optical disk 32 the image keyword data included in the control data for the target document. The image keyword data thus fetched from the optical disk 32, is transferred by way of the optical disk interface circuit 68 to the display data storage memory of the display memory block 72, and the image keyword represented by the image keyword data is displayed on the screen of the CRT display unit 22. Shown in FIG. 19 is an image frame indicating the main keywords and image keywords associated with the documents "1" to "6" thus listed on the screen of the CRT display unit 22 of the system at step J06.

In preparation for the display of another set of documents on the CRT display unit 22, the step J06 is followed by step J07 to calculate new addresses at which the list of the keywords for the additional documents is to be displayed on the screen of the CRT display unit 22. The central processing unit 60 then reverts to step J02 to repeat the loop of the steps J02 to J05 or steps J02 to J07 or terminate execution of this subroutine program I05 to revert to the data search subroutine program A04, described with reference to FIGS. 16A and 16B.

Figure 20:
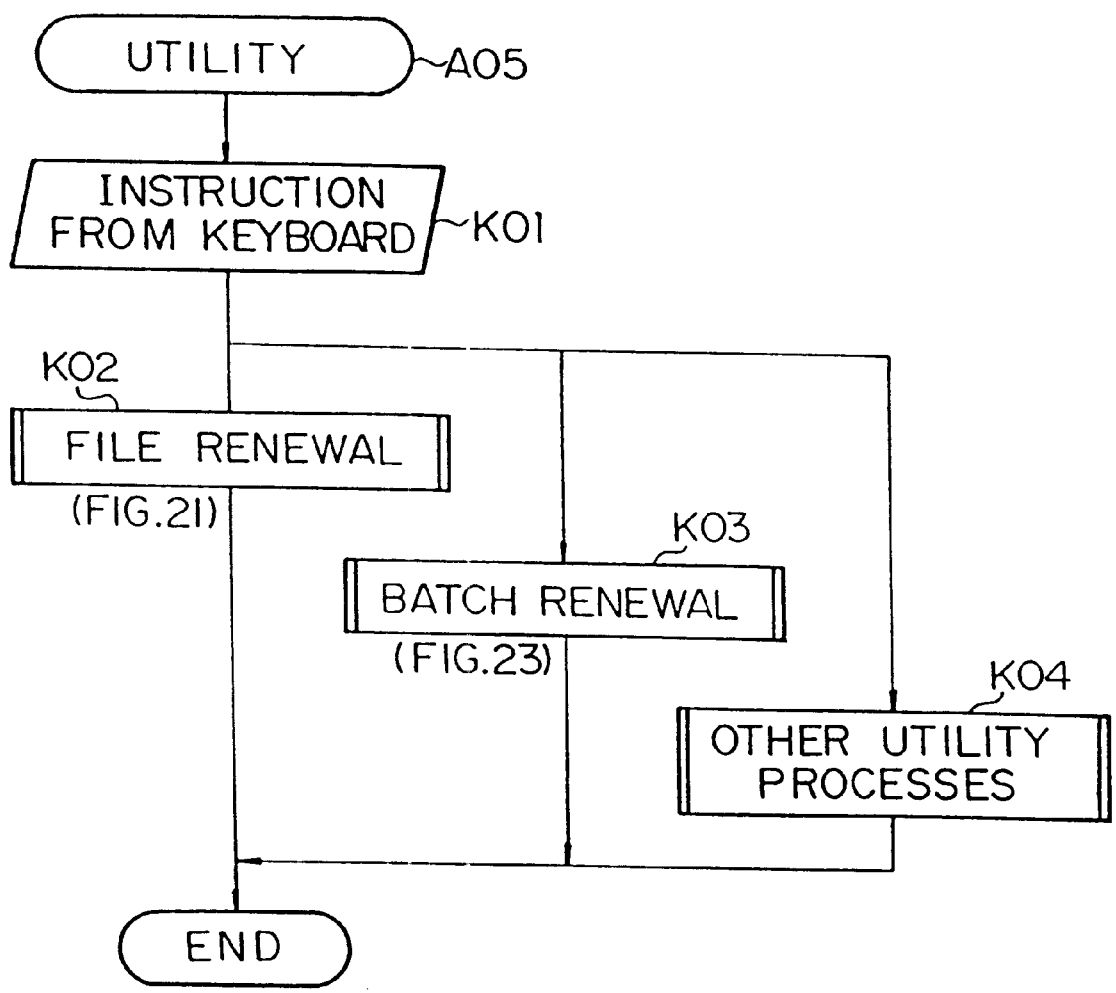
FIG. 20 is a flowchart showing the details of a utility subroutine program further included in the main routine program illustrated in FIG. 3.

FIG. 20 shows the details of the utility subroutine program A05, further included in the main routine program hereinbefore described with reference to FIG. 3.

The utility subroutine program A05 starts with step K01, at which the central processing unit 60 is responsive to an instruction which may be entered through the keyboard 54 by the operator of the system. The instruction which the central processing unit 60 may thus receive from the keyboard 54 in this instance may be for the execution of a file renewal subroutine program K02, a batch renewal subroutine program K03, or a subroutine program K04 for executing any other utility process. Details of these file renewal subroutine program K02 and batch renewal K03 will be hereinafter described with reference to FIGS. 21A and 21B and FIG. 23, respectively.

Figure 21A:
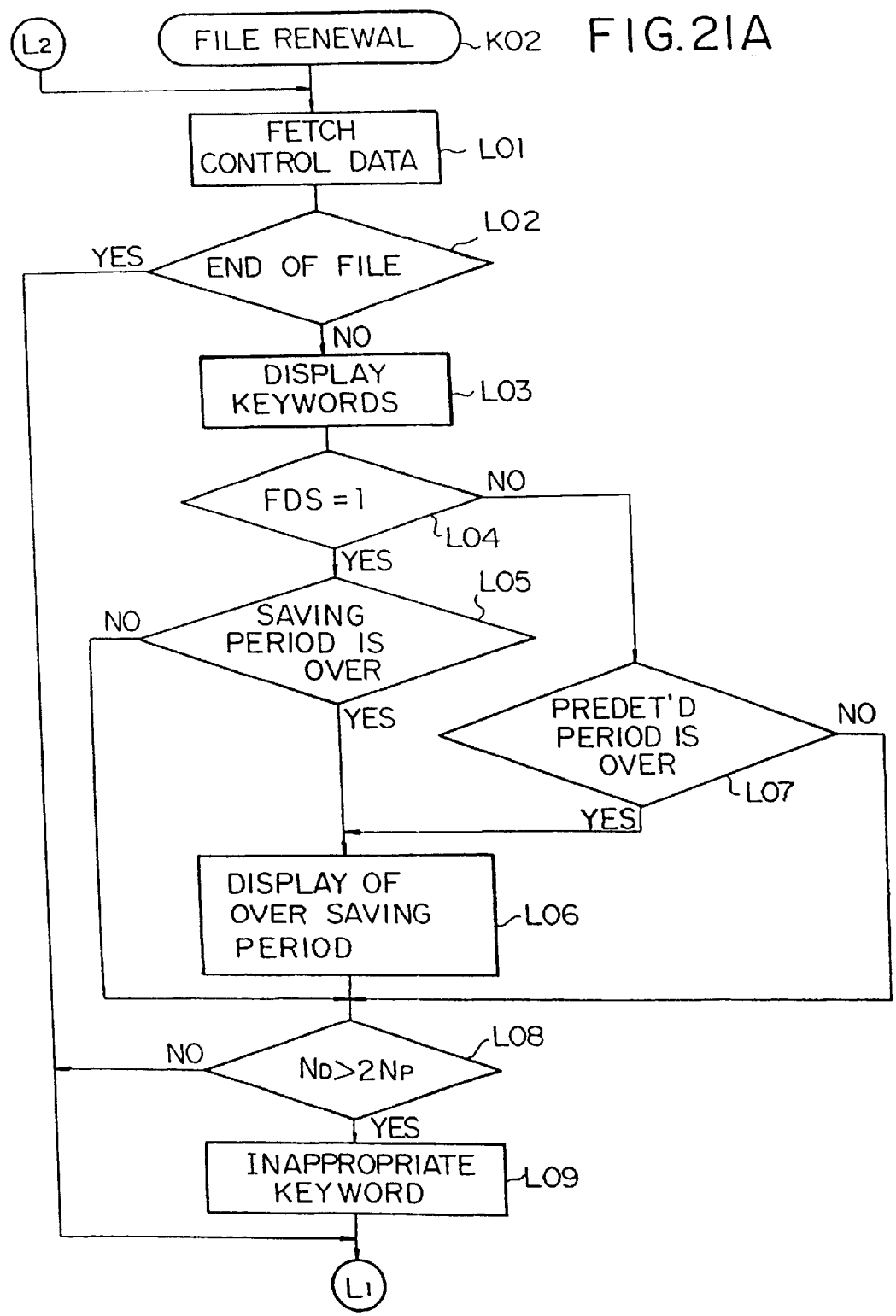

FIGS. 21A and 21B show the details of the file renewal subroutine program K02 included in the utility subroutine program A05, above described with reference to FIG. 20. Illustrated in FIG. 22 is a menu of selectable items which are to be displayed on the CRT display unit 22 of the system at the start of the file renewal subroutine program K02.

The file renewal subroutine program K02 starts with step L01, at which the control data associated with the image data of a document stored in the hard disk 38 is fetched through the hard disk interface circuit 66. The central processing unit 60 then proceeds to step L02 to check if there is no document to be handled by this file renewal subroutine program K02. If the answer for this step L02 is given in the negative, the central processing unit 60 proceeds to step L03 to display the main keyword or keywords of the document having the control data thus fetched from the hard disk 38. The central processing unit 60 thereafter proceeds to step L04 to detect whether or not the image data save flag "FDS" is set to a logic "1" state for the document. If the answer for this this step L04 is given in the affirmative, the central processing unit 60 further checks at step L05 if the period of time determined necessary to same the document currently retrieved has lapsed or not. If the answer for this step L05 is also given in the affirmative, the central processing unit 60 proceeds to step L06, at which the period of time for which the particular document was determined to be saved and the message showing that such a period of time has already lapsed are indicated on the screen of the CRT display unit 22.

If, on the other hand, it is found at step L04 that the image data save flag "FDS" is not set to a logic "1" state for the document (the answer for the step L04 is given in the negative), the central processing unit 60 checks at step L07 if a predetermined period of time has lapsed since the particular document was registered. If the answer for this step L07 is given in the affirmative, the step L07 is followed by the step L06, and the period of time for which the document was determined to be saved and the message showing that the period of time has already lapsed are indicated on the CRT display unit 22. If the answer for the step L07 is given in the negative, the step L06 is skipped over and the step L07 is followed by step L08.

The step L08 is executed either subsequent to the step L06 or following a negative answer in for the step L05 or step L07, determines whether or not the current valid count numbers $N_P$ and $N_D$ for printing and displaying are reasonable. Such a decision may be made by examining if the count number $N_D$ for displaying is larger than the count number $N_P$ for printing times two, viz., $$N_D > N_P * 2.$$

When the count number $N_D$ is found to be larger than the count number $N_P$ times two for the document retrieved and currently indicated on the screen of the CRT display unit 22, it is considered that the number of times the document has been printed out is significantly smaller than the number of times the document has been displayed. This in turn will mean that the particular document is quite unlikely to be the target document which the operator desires to reference.

Thus, it may be checked at step L08 if the count number $N_D$ for displaying is larger than the count number $N_P$ for printing times two with in respect to the document. If it is determined at this step L08 that the current valid count numbers $N_P$ and $N_D$ for printing and displaying are reasonable for the document, the step L08 is followed by step L09 at which the keyword which was used for the retrieval of the target document is deemed inappropriate, and a message to such an effect is indicated on the screen of the CRT display unit 22.

Subsequent to step L09 or if it is found at step L08 that the count numbers $N_P$ and $N_D$ for printing and displaying are reasonable for the document, the central processing unit 60 proceeds to step L10 so as to be responsive to any instruction which may be entered through the keyboard 54 by the operator of the system. This step L10 is also executed when it is found at step L02 that there is no document to be handled by this file renewal subroutine program K02.

It is thus checked at step L11 if there is an instruction to put an end to the file renewal subroutine program K02. If the answer for this step L11 is given in the affirmative, the central processing unit 60 terminates execution of this file renewal subroutine program K02 and may revert to the utility subroutine program A05, hereinbefore described with reference to FIG. 20. If it is found at step L11 that there is no instruction to put an end to the subroutine program K02, the central processing unit 60 proceeds to step L12 to detect whether or not there is an instruction requiring the renewal of another document. If the answer for this step L12 is given in the affirmative, the central processing unit 60 return to step L01 and may repeat the loop of the steps L01 to L12 until the answer for the step L11 turns affirmative or the answer for the step L12 turns negative.

When it is found at step L12 that there is no additional document to be renewed (the answer for the step L12 is given in the negative), the central processing unit 60 proceeds to step L13 to check if there is an instruction requiring deletion of the document retrieved. If the answer for this step L13 is given in the affirmative, the central processing unit 60 proceeds to step L14 to perform a procedure to delete the control data for the particular document from the hard disk 38. It may be noted that the optical disk 32 used in the system under consideration is assumed to be of the read-only memory type. Accordingly, the image data for the document having the control data thus deleted from the hard disk 38 is maintained in the optical disk 32 but is not accessible without control data available in association with the image data.

On the other hand, if there is no instruction requiring deletion of the document under consideration, it is checked at step L15 whether or not there is an instruction requiring a change of the keyword for the document retrieved. If the answer for this step L15 is given in the affirmative, the central processing unit 60 proceeds to step L16 to perform a procedure to change the keyword for the document. If it is found at step L15 that there is no instruction requiring a change of the keyword for the document (the answer for the step L15 is given in the negative), the central processing unit 60 reverts to step L10 and may repeat the loop of the steps subsequent to the step L10 until the answer for the step L11 turns affirmative.

Figure 23:
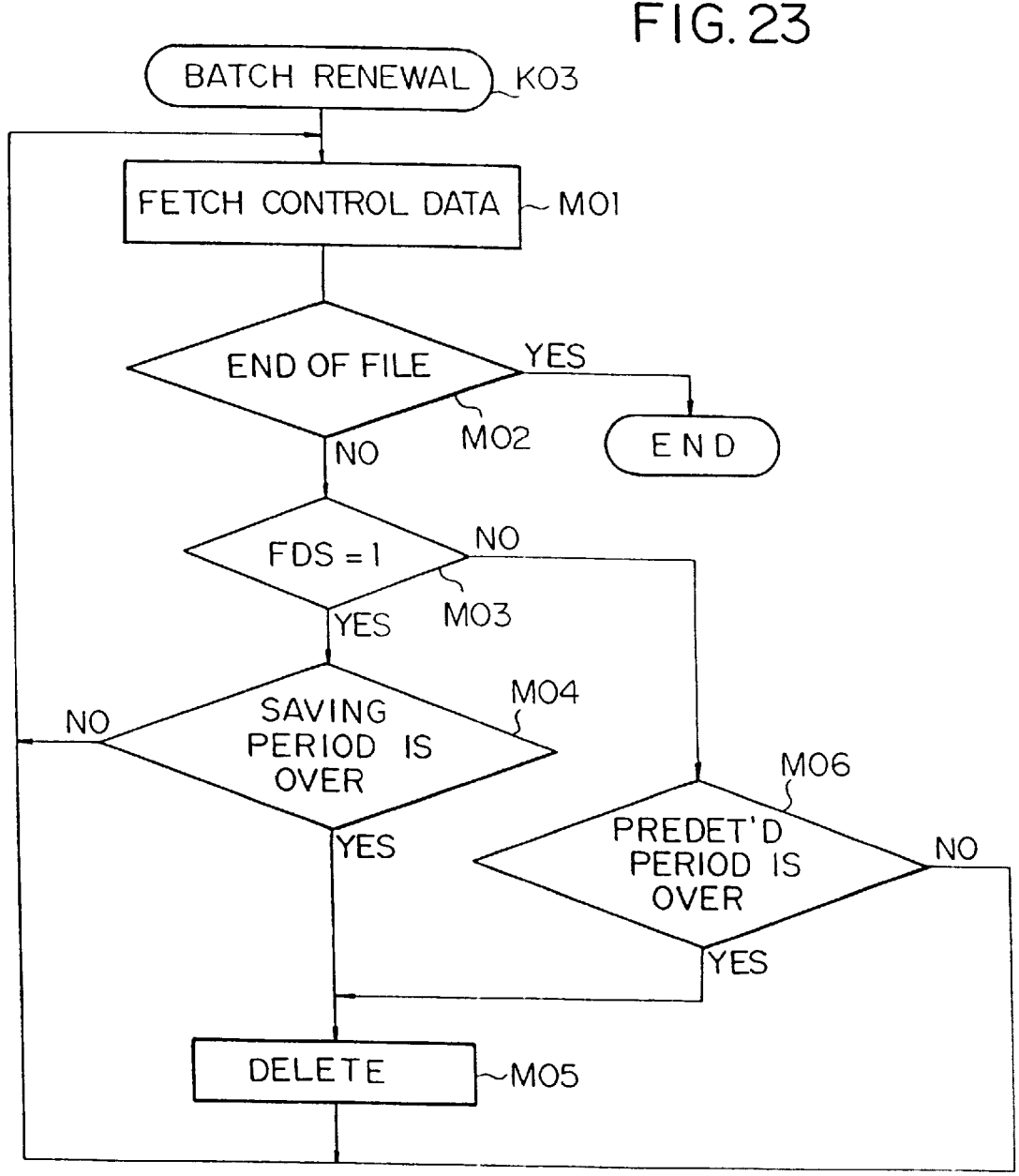
FIG. 23 is a flowchart showing the details of a batch renewal subroutine program also included in the utility subroutine program illustrated in FIG. 20.

FIG. 23 shows the details of the batch renewal sub-routine program K03, also included in the utility subroutine program A05, hereinbefore described with reference to FIG. 20.

The batch renewal subroutine program K03 starts with step M01, at which the control data associated with the image data of a document stored in the hard disk 38 are fetched through the hard disk interface circuit 66. The central processing unit 60 then proceeds to step M02 to check if there is no document to be handled by this batch renewal subroutine program K03. If the answer for this step M02 is given in the affirmative, the central processing unit 60 terminates execution of this batch renewal subroutine program K03 and may revert to the utility subroutine program A05, hereinbefore described with reference to FIG. 20. If it is found at step M02 that there is no document to be handled by this batch renewal subroutine program K03, the central processing unit 60 proceeds to step M03 to detect whether or not the image data save flag "FDS" is set to a logic "1" state for the document. If the answer for this this step M03 is given in the affirmative, the central processing unit 60 further checks at step M04 if the period of time for determined necessary to same the document currently retrieved was has lapsed or not. If the answer for this step M04 is also given in the affirmative, the central processing unit 60 proceeds to step M05 to perform a procedure to delete the control data for the particular document from the hard disk 38.

On the other hand, if it is found at step M03 that the image data save flag "FDS" is not set to a logic "1" state for the document (the answer for the step M03 is given in the negative), the central processing unit 60 checks at step M06 if a predetermined period of time has lapsed since the particular document was registered. If the answer for this step M06 is given in the affirmative, the step M06 is followed by the step M05 to perform the delete procedure. If the answer for the step M06 is given in the negative, the step M06 is skipped over and the central processing unit 60 may revert to step M01 and may repeat the loop of the steps M01 to M06 until the answer for the step M02 turns affirmative.

While the deletion of a document is effected with the control data for the document deleted from the hard disk 38, any appropriate means may be provided to determine whether a document should be deleted or to automatically delete a document on confirmation that the document has been saved for a predetermined period of time.

It may be further noted that, while the image keyword data is stored on the optical disk 32 without being coded and compressed before the data is loaded into the disk, image keyword data used in a system according to the present invention may be coded and compressed by means of the data compression/extension block 76 before the data is stored on the optical disk 32.

What is claimed is:

1. In an image filing system adapted to read an image from a document, to store data relating to the image read from the document in a memory, and to read the data from the memory to display an image represented by the data read from the memory, a method of furnishing said document with auxiliary document identification data in addition to main document identification data identifying the document, the auxiliary document identification forming a portion of said image and being representative of a characterizing feature of the image, comprising the steps of:

a) reading an original document image from the document, generating the data relating to the image read from the document, and storing the generated data into said memory, b) receiving, as said main document identification data, a keyword identifying the document, c) generating said auxiliary document identification data in response to an instruction entered by an operator of the system, this step including the steps of specifying said portion of said image and storing image data representing said portion of said image into said memory, d) in response to an instruction entered by the operator of the system, searching for a document identified by at least one keyword from among a plurality of documents having their data stored in said memory, and e) displaying said at least one keyword and auxiliary data for each document found in said search of step (d).

2. A method as set forth in claim 1, in which said data relating to the image read from the document included both image data representative of the whole image read from said document and image data representative of said portion of the image, the image data representative of the whole image read from said document being stored in one data storage area of said memory and the image data representative of said portion of the image being stored in another data storage area of said memory.

3. A method as set forth in claim 1, in which said data relating to the image read from the document includes both image data representative of the whole image read from said document and image data representative of said portion of the image, the image data representative of the whole image read from said document being stored in said memory after being compressed and the image data representative of said portion of the image being stored in said memory without being compressed.

4. A method as set forth in claim 3, in which said auxiliary document identification is stored in said memory after a reduction of the amount of data forming the auxiliary document identification data.

5. A method as set forth in claim 4, in which the amount of data forming the auxiliary document identification data is reduced by reducing the degree of resolution of said portion of said image.

6. A method as set forth in claim 4, in which the amount of data forming the auxiliary document identification data is reduced by reducing the size of said portion of said image displayed in said displaying step.

7. In an image filing system adapted to read an image from a document, to store data relating to the image read from the document in a memory, and to read the data from the memory to display an image represented by the data read from the memory, a method of furnishing said document with auxiliary document identification data in addition to main document identification data identifying the document, the auxiliary document identification data forming a portion of said image and being representative of a characterizing feature of the image, comprising the steps of:

a) reading an original document image from the document, generating the data relating to the image read from the document, and storing the generated data into said memory, b) receiving, as said main document identification data, a keyword identifying the document, c) searching said memory for a document having a keyword identical with the keyword received in said receiving step, and d) upon detection of a document having a keyword identical with the keyword received in said receiving step, generating said auxiliary document identification data, the generating step including the steps of specifying said portion of said image and storing data representing said portion of said image in said memory, thereby furnishing a detected document with the auxiliary document identification data by means of which the detected document identified by the auxiliary document identification data is to be distinguished from another document, if any, having a keyword identical with the keyword received.

8. A method as set forth in claim 7, further comprising the steps of:

e) searching for a document identified by the keyword from among a plurality of documents having their data stored in said memory, and f) listing a detected document retrieved from said memory and displaying the keyword and the auxiliary document identification data identifying the detected document listed.

9. In an image filing system capable of reading an image from a document, storing data relating to the image read from the document in a memory and reading the data from the memory for displaying an image represented by the data read from the memory, a method of furnishing said document with auxiliary document identification data in addition to main document identification identifying the document, comprising the steps of:

reading an original document image from the document, generating the data relating to the image read from the document, and storing the generated data in said memory, furnishing said main auxiliary document identification data to the document;

furnishing said auxiliary document identification data to the document after the document is stored in said memory, wherein the step of furnishing said auxiliary document identification data to said document comprises, displaying the documents stored in said memory, specifying a portion of the image of the document displayed, said portion being representative of a characterizing feature of the image and generating image data representing the specified portion of the image, reducing the amount of the image data representing the specified portion of the image, and storing the reduced amount of image data as said auxiliary document identification data in said memory; and displaying concurrently said main document identification data and said auxiliary document identification data for a document during a search operation.

10. A method as set forth in claim 9, in which said data relating to the image read from the document includes both image data representative of the whole image read from said document and image data representative of said portion of the image, the image data representative of the whole image read from said document being stored into said memory after being compressed and the image data representative of said portion of the image being stored into said memory without being compressed.

11. A method as set forth in claim 9, in which said auxiliary document identification data is stored into said memory after a reduction of the amount of data forming the auxiliary document identification data.

12. A method as set forth in claim 11, in which the amount of data forming the auxiliary document identification data is reduced by reducing the degree of resolution of said portion of said image.

13. A method as set forth in claim 11, in which the amount of data forming the auxiliary document identification data is reduced by reducing the size of said portion of said image displayed in said displaying step.

14. An image filing apparatus comprising:
- an image reader to read an image of a document to generate document image data;
- a data generator to generate search image data relating to the image of the document to enable identification of such document when searched;
- a memory to store both the document image data and the search image data; and
- a display to display the search image data identified by identification data so as to enable a next identification using displayed search image data.

15. An image filing apparatus as claimed in claim 14, wherein said data generator generates the search image data by reducing an amount of the document image data.

16. An image filing apparatus as claimed in claim 14, wherein the search image data generated by said data generator corresponds to a partial portion of the document.

17. An image filing apparatus, comprising:
- a first memory which stores a plurality of original document images;
- a second memory which stores a plurality of keywords, wherein at least one keyword corresponds to each stored original document image;
- a designation unit to designate a portion of an original document image as an auxiliary image;
- a third memory which stores a plurality of auxiliary images;
- an input device to receive a search keyword;
- a display; and
- a controller, coupled to each memory, the designation unit, the input device, and the display, to search the second memory using a search keyword and list selected corresponding auxiliary images from the second memory on the display based on the search keyword.

18. An image filing apparatus, comprising:
- a first memory which stores a plurality of original document images;
- a second memory which stores a plurality of keywords, wherein at least one keyword corresponds to each stored original document image;
- a designation unit to designate a portion of said original document as an auxiliary image;
- a third memory which stores a plurality of said auxiliary images;
- a detector which detects a keyword stored in said second memory and outputs a signal in response to such a detection; and
- a controller, coupled to at least the designation unit and the detector, which initiates the designation unit with regard to an original document image in response to a signal from the detector.

* * * * *

UNITED STATES PATENT AND TRADEMARK OFFICE
CERTIFICATE OF CORRECTION

PATENT NO.    : 6,247,031 B1
DATED         : June 12, 2001
INVENTOR(S)   : Masamichi Sugiura et al.

It is certified that error appears in the above-identified patent and that said Letters Patent is hereby corrected as shown below:

Title page,
Item [63], Related U.S. Application Data, delete
"Continuation of application No. 08/243,063, filed on May 13, 1994, now abandoned, which is a continuation of application No. 08/016,491, filed on Feb. 10, 1993, now abandoned, which is a continuation of application No. 07/900,554, filed on Jun. 18, 1992, now abandoned, which is a continuation of application No. 07/782,799, filed on Oct. 24, 1991, now abandoned, which is a continuation of application No. 07/345,810, filed on May 1, 1989, now abandoned, which is a continuation of application No. 08/478,892, filed on Jun. 7, 1995, now abandoned.", and insert --Continued prosecution application of Application Serial No. 08/478,892, filed on June 7, 1995, now abandoned, which is a continuation of Application Serial No. 08/243,063, filed on May 13, 1994, now abandoned, which is a continuation of Application Serial No. 08/016,491, filed on February 10, 1993, now abandoned, which is a continuation of Application Serial No. 07/900,544, filed on June 18, 1992, now abandoned, which is a continuation of Application Serial No. 07/782,799, filed on October 24, 1991, now abandoned, which is a continuation of Application Serial No. 07/345,810, filed on May 1, 1989, now abandoned.--

Drawings,
Sheet 5, delete FIG. 6 in its entirety, and insert the following therefor:

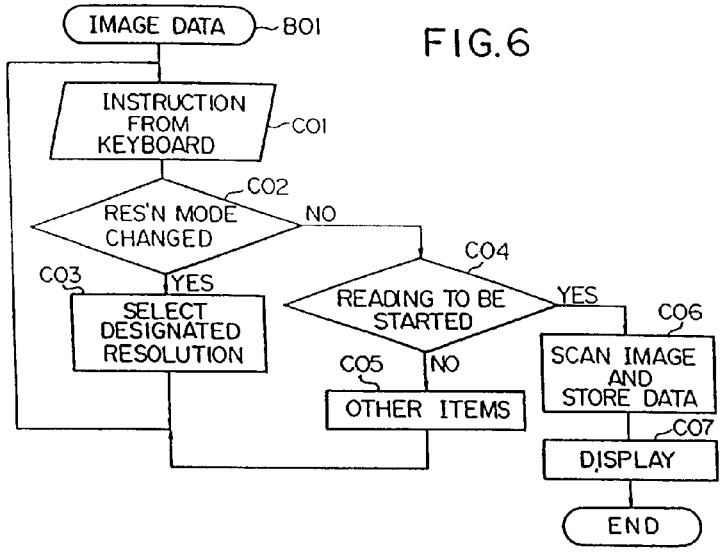

UNITED STATES PATENT AND TRADEMARK OFFICE
CERTIFICATE OF CORRECTION

PATENT NO. : 6,247,031 B1
DATED : June 12, 2001
INVENTOR(S) : Masamichi Sugiura et al.

It is certified that error appears in the above-identified patent and that said Letters Patent is hereby corrected as shown below:

Drawings (cont'd),
Sheet 5, delete FIG. 7 in its entirety, and insert the following therefor:

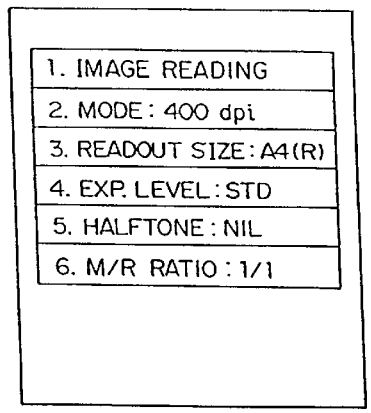

Sheet 6, delete FIG. 8A in its entirety and insert the following therefor:

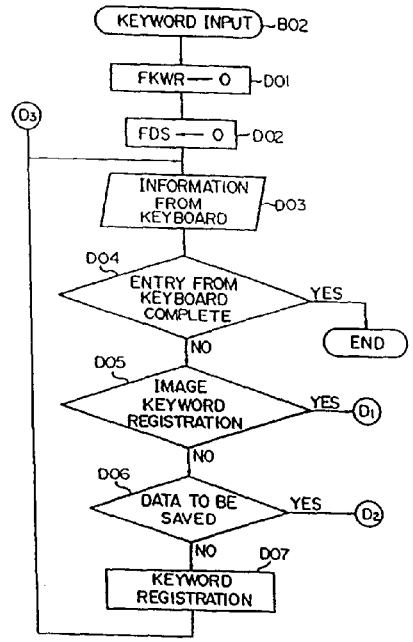

UNITED STATES PATENT AND TRADEMARK OFFICE
CERTIFICATE OF CORRECTION

PATENT NO. : 6,247,031 B1
DATED : June 12, 2001
INVENTOR(S) : Masamichi Sugiura et al.

It is certified that error appears in the above-identified patent and that said Letters Patent is hereby corrected as shown below:

Drawings (cont'd),
Sheet 20, delete FIG. 21A in its entirety, and insert the following therefor:

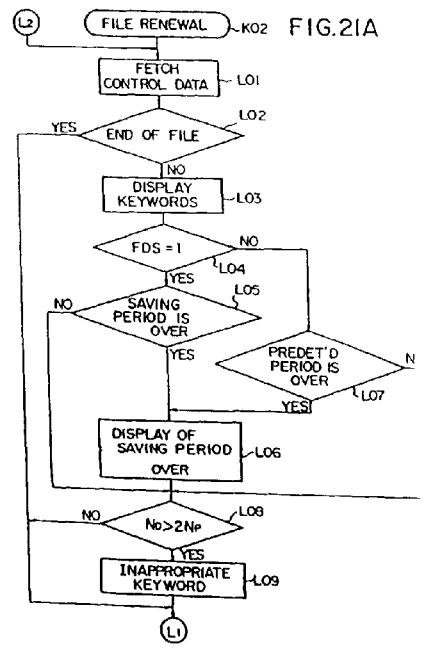

Sheet 21, delete FIG. 21B in its entirety and insert the following therefor:

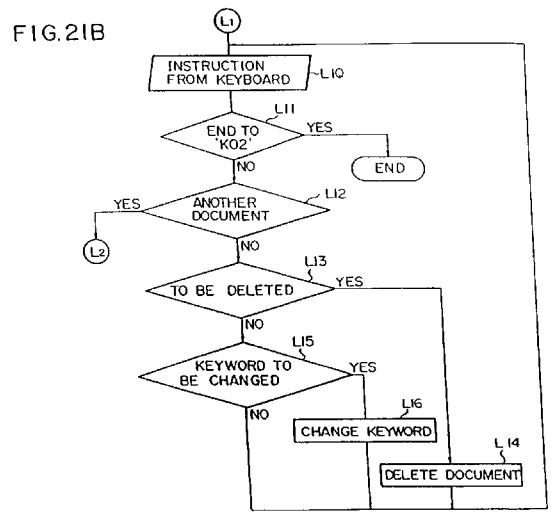

UNITED STATES PATENT AND TRADEMARK OFFICE
CERTIFICATE OF CORRECTION

PATENT NO.    : 6,247,031 B1
DATED         : June 12, 2001
INVENTOR(S)   : Masamichi Sugiura et al.

It is certified that error appears in the above-identified patent and that said Letters Patent is hereby corrected as shown below:

Column 21,
Line 11, delete "included", and insert -- includes --.

Signed and Sealed this

Ninth Day of September, 2003

JAMES E. ROGAN
*Director of the United States Patent and Trademark Office*